(12) United States Patent
Fujii et al.

(10) Patent No.: US 9,315,608 B2
(45) Date of Patent: Apr. 19, 2016

(54) CONJUGATED DIENE POLYMER RUBBER, AND CONJUGATED DIENE POLYMER RUBBER COMPOSITION

(71) Applicant: SUMITOMO CHEMICAL COMPANY, LIMITED, Tokyo (JP)

(72) Inventors: Toru Fujii, Singapore (SG); Takuya Sudo, Chiba (JP); Mayumi Oshima, Tokyo (JP); Katsunari Inagaki, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/219,540

(22) Filed: Mar. 19, 2014

(65) Prior Publication Data

US 2014/0206811 A1 Jul. 24, 2014

Related U.S. Application Data

(62) Division of application No. 13/034,067, filed on Feb. 24, 2011.

(30) Foreign Application Priority Data

Feb. 26, 2010 (JP) .................................. 2010-041901
Feb. 26, 2010 (JP) .................................. 2010-041902

(51) Int. Cl.
| | |
|---|---|
| C08F 279/02 | (2006.01) |
| C08C 19/44 | (2006.01) |
| C08F 236/04 | (2006.01) |
| C08L 15/00 | (2006.01) |
| C08L 19/00 | (2006.01) |
| C08K 3/36 | (2006.01) |
| C08K 5/548 | (2006.01) |

(52) U.S. Cl.
CPC ............... *C08F 279/02* (2013.01); *C08C 19/44* (2013.01); *C08F 236/04* (2013.01); *C08L 15/00* (2013.01); *C08L 19/006* (2013.01); *C08K 3/36* (2013.01); *C08K 5/548* (2013.01)

(58) Field of Classification Search
CPC ........ C08F 236/04; C08F 4/48; C08F 279/02; C08L 15/00; C08L 2666/08; C08L 19/44; C08L 19/006; C08K 3/36; C08K 5/548
USPC .................... 524/526; 525/209, 236
See application file for complete search history.

(56) References Cited

U.S. PATENT DOCUMENTS

| | | | |
|---|---|---|---|
| 5,189,109 A | 2/1993 | Imai et al. | |
| 2007/0010610 A1* | 1/2007 | Kondo | ............................ 524/493 |
| 2008/0275184 A1* | 11/2008 | Karato et al. | ................. 525/105 |
| 2009/0005497 A1* | 1/2009 | Maeda et al. | ................. 524/572 |
| 2010/0056711 A1* | 3/2010 | Fujii et al. | ..................... 524/571 |
| 2010/0144954 A1* | 6/2010 | Kikuchi et al. | ............... 524/506 |
| 2011/0319519 A1 | 12/2011 | Sone et al. | |

FOREIGN PATENT DOCUMENTS

| | | |
|---|---|---|
| CN | 101240090 A | 8/2008 |
| EP | 1873168 A1 | 1/2008 |
| JP | 63-186748 A | 8/1988 |
| JP | 1-217047 A | 8/1989 |
| JP | 2005-290355 A | 10/2005 |
| JP | 2007-224195 A | 9/2007 |
| JP | 2009-263479 A | 11/2009 |
| JP | 2009-287020 A | 12/2009 |
| JP | 2010-209256 A | 9/2010 |

OTHER PUBLICATIONS

Singaporean Search Report issued Sep. 26, 2011 for counterpart Singapore Patent Application 201101339-8.

Chinese Office Action issued in corresponding Office Action No. 201110049691.0 dated Jan. 6, 2014.

Communication dated Sep. 1, 2015, from the Japanese Patent Office in counterpart application No. 2014-151523.

\* cited by examiner

*Primary Examiner* — Liam J Heincer
*Assistant Examiner* — Nicolas Hill
(74) *Attorney, Agent, or Firm* — Sughrue Mion, PLLC

(57) ABSTRACT

A conjugated diene polymer rubber is provided that includes component (A) and component (B) below, component (A) having a content, with the total amount of component (A) and component (B) as 100% by weight, of from 5% to 90% by weight, and component (B) having a content of from 95% to 10% by weight, Component (A): a conjugated diene polymer rubber component modified with a carbonyl group- and substituted amino group-containing compound Component (B): a conjugated diene polymer rubber component modified with a compound represented by formula (IIa) below $$(R^{21}O)_m Si(R^{22}A)_n R^{23}{}_{4-m-n} \quad \text{(IIa)}$$

wherein m denotes a number from 1 to 3, n denotes a number from 1 to 3, m+n is from 2 to 4, $R^{21}$ and $R^{23}$ denote a hydrocarbyl group, $R^{22}$ denotes a hydrocarbylene group, A denotes a substituted amino group or an optionally substituted hydrocarbyloxy group, when there are a plurality of $R^{21}$s the plurality of $R^{21}$s may be identical to or different from each other, when there are a plurality of $R^{22}$s the plurality of $R^{22}$s may be identical to or different from each other, when there are a plurality of $R^{23}$s the plurality of $R^{23}$s may be identical to or different from each other, and when there are a plurality of As the plurality of As may be identical to or different from each other.

7 Claims, No Drawings

CONJUGATED DIENE POLYMER RUBBER, AND CONJUGATED DIENE POLYMER RUBBER COMPOSITION

This is a Divisional of application Ser. No. 13/034,067 filed Feb. 24, 2011, which claims priority based on Japanese Patent Application No. 2010-041901 filed Feb. 26, 2010 and 2010-041902 filed Feb. 26, 2010, the contents of each of which are incorporated herein by reference in their entirety.

TECHNICAL FIELD

The present invention relates to a conjugated diene polymer rubber, and a conjugated diene polymer rubber composition.

BACKGROUND ART

In recent years, with the growing concern over environmental problems the demand for good fuel economy for automobiles has been becoming stronger, and there is also a demand for excellent fuel economy for rubber composition used for automobile tires. As a rubber composition for automobile tires, a polymer rubber composition comprising a conjugated diene polymer rubber such as polybutadiene rubber or a butadiene-styrene copolymer rubber and a filler such as carbon black or silica, etc. is used.

For example, as a conjugated diene polymer rubber, a rubber composition employing a polymer rubber formed by modifying with a dialkylamino group-containing acrylamide one terminus of a polymer rubber formed by copolymerizing butadiene and styrene using an alkyllithium as a polymerization initiator (see e.g. JP-A-1-217047 (JP-A denotes a Japanese unexamined patent application publication)), as a conjugated diene polymer rubber, a rubber composition employing a polymer rubber formed by modifying with a dialkylamino group-containing alkoxylsilane one terminus of a polymer formed by copolymerizing butadiene and styrene using an alkyllithium as a polymerization initiator (see e.g. JP-A 63-186748 and JP-A 2005-290355), etc. have been proposed as polymer compositions having good fuel economy.

DISCLOSURE OF THE INVENTION

However, the rubber composition employing the above-mentioned conventional conjugated diene polymer rubber is not always fully satisfactory in terms of abrasion resistance.

Under such circumstances, it is an object of the present invention to provide a conjugated diene polymer rubber that can give a conjugated diene polymer rubber composition having excellent abrasion resistance and a conjugated diene polymer rubber composition containing the conjugated diene polymer rubber and a filler.

A first aspect of the present invention relates to a conjugated diene polymer rubber comprising component (A) and component (B) below, component (A) having a content, with the total amount of component (A) and component (B) as 100% by weight, of from 5 to 90% by weight, and component (B) having a content of from 95 to 10% by weight, component (A): a conjugated diene polymer rubber component modified with a carbonyl group- and substituted amino group-containing compound component (B): a conjugated diene polymer rubber component modified with a compound represented by formula (IIa) below, $$(R^{21}O)_m Si(R^{22}A)_n R^{23}{}_{4-m-n} \qquad (IIa)$$

wherein m denotes a number from 1 to 3, n denotes a number from 1 to 3, m+n is from 2 to 4, $R^{21}$ and $R^{23}$ denote a hydrocarbyl group, $R^{22}$ denotes a hydrocarbylene group, A denotes a substituted amino group or an optionally substituted hydrocarbyloxy group, when there are a plurality of $R^{21}$s the plurality of $R^{21}$s may be identical to or different from each other, when there are a plurality of $R^{22}$s the plurality of $R^{22}$s may be identical to or different from each other, when there are a plurality of $R^{23}$s the plurality of $R^{23}$s may be identical to or different from each other, and when there are a plurality of As the plurality of As may be identical to or different from each other.

A second aspect of the present invention relates to a conjugated diene polymer rubber composition comprising the conjugated diene polymer rubber and a filler.

MODE FOR CARRYING OUT THE INVENTION

Conjugated Diene Polymer Rubber

The conjugated diene polymer rubber of the present invention is a diene polymer rubber comprising component (A) and component (B) below, component (A) having a content, with the total amount of component (A) and component (B) as 100% by weight, of from 5 to 90% by weight, and component (B) having a content of from 95 to 10% by weight.

Component (A)

Component (A) is a conjugated diene polymer rubber component that is modified with a carbonyl group- and substituted amino group-containing compound.

A conjugated diene polymer rubber component in component (A) contains a conjugated diene based monomer unit (conjugated unit). Examples of the conjugated diene include 1,3-butadiene, isoprene, 1,3-pentadiene, 2,3-dimethyl-1,3-butadiene, and 1,3-hexadiene, and one or more types thereof may be used. The conjugated diene is preferably 1,3-butadiene or isoprene.

The conjugated diene polymer rubber component of component (A) may further comprise, in addition to the conjugated diene-based constituent unit (conjugated diene unit), a constituent unit based on another monomer. Examples of said other monomer include an aromatic vinyl, a vinylnitrile, and an unsaturated carboxylic acid ester. Examples of the aromatic vinyl include styrene, α-methylstyrene, vinyltoluene, vinylnaphthalene, divinylbenzene, trivinylbenzene, and divinylnaphthalene. Examples of the vinylnitrile include acrylonitrile, and examples of the unsaturated carboxylic acid ester include methyl acrylate, ethyl acrylate, methyl methacrylate, and ethyl methacrylate. Among them, an aromatic vinyl is preferable, and styrene is more preferable.

In order to increase strength the conjugated diene polymer of component (A) preferably contains an aromatic vinyl-based constituent unit (aromatic vinyl unit), and the content of the aromatic vinyl unit, relative to 100% by weight of the total amount of the conjugated diene unit and the aromatic vinyl unit, is preferably at least 10% by weight (the content of the conjugated diene unit being no greater than 90% by weight), and more preferably at least 15% by weight (the content of the conjugated diene unit being no greater than 85% by weight). Furthermore, from the viewpoint of fuel economy, the content of the aromatic vinyl unit is preferably no greater than 50% by weight (the content of the conjugated diene unit being at least 50% by weight), and more preferably no greater than 45% by weight (the content of the conjugated diene unit being at least 55% by weight).

In order to improve abrasion resistance and fuel economy, the conjugated diene polymer rubber component of component (A) preferably contains a constituent unit based on a silicon-containing monomer.

The silicon-containing monomer is preferably a monomer represented by formula (X) below,

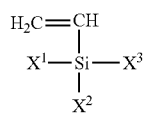

(X)

wherein $X^1$, $X^2$, and $X^3$ denote an optionally substituted hydrocarbyl group or a group represented by formula (Xa) below, and at least one of $X^1$, $X^2$, and $X^3$ is a group represented by formula (Xa) below,

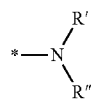

(Xa)

wherein R' and R" denote a hydrocarbyl group having 1 to 6 carbon atoms that may contain at least one atom selected from the group consisting of a nitrogen atom, an oxygen atom, and a silicon atom, a silyl group, a substituted silyl group, or a divalent group having 2 to 12 carbon atoms in which R' and R" are bonded to each other, and * denotes a bonding position.

In the present specification, the hydrocarbyl group denotes a hydrocarbon residue. The substituted hydrocarbyl group (the hydrocarbyl group containing a substituent) denotes a group in which at least one hydrogen atom of the hydrocarbon residue is replaced by a substituent. The hydrocarbyloxy group denotes a group in which the hydrogen atom of a hydroxy group is replaced by a hydrocarbyl group, and the substituted hydrocarbyloxy group (the hydrocarbyloxy group containing a substituent) denotes a group in which at least one hydrogen atom of a hydrocarbyloxy group is replaced by a substituent. The substituted silyl group denotes a group in which at least one hydrogen atom of a silyl group is replaced by a substituent.

In formula (X), $X^1$, $X^2$, and $X^3$ denote an optionally substituted hydrocarbyl group or a group represented by formula (Xa) below, and at least one of $X^1$, $X^2$, and $X^3$ is a group represented by formula (Xa) above.

Examples of the hydrocarbyl groups denoted by $X^1$, $X^2$, and $X^3$ include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; an aryl group such as a phenyl group, a methylphenyl group, or an ethylphenyl group; and an aralkyl group such as a benzyl group. The hydrocarbyl group is preferably an alkyl group.

The number of carbon atoms of the hydrocarbyl groups denoted by $X^1$, $X^2$, and $X^3$ is preferably from 1 to 4, and more preferably 1 or 2.

Examples of the substituted hydrocarbyl groups denoted by $X^1$, $X^2$, and $X^3$ include an alkoxyalkyl group such as a methoxymethyl group, a methoxyethyl group, an ethoxymethyl group, or an ethoxyethyl group.

The substituted hydrocarbyl group is preferably an alkoxyalkyl group, and more preferably an alkoxyalkyl group having 2 to 4 carbon atoms.

The number of carbon atoms of the substituted hydrocarbyl groups denoted by $X^1$, $X^2$, and $X^3$ is preferably from 1 to 4.

R' and R" of formula (Xa) are hydrocarbyl groups having 1 to 6 carbon atoms that may contain at least one atom selected from the group consisting of a nitrogen atom, an oxygen atom, and a silicon atom, silyl groups, substituted silyl groups, or divalent groups having 2 to 12 carbon atoms in which R' and R" are bonded to each other.

Examples of the hydrocarbyl group having 1 to 6 carbon atoms denoted by R' and R" include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; and a phenyl group. It is preferably an alkyl group, more preferably an alkyl group having 1 to 4 carbon atoms, and yet more preferably a methyl group, an ethyl group, an n-propyl group, or an n-butyl group.

Examples of the nitrogen atom-containing hydrocarbyl group denoted by R' and R" include a dialkylaminoalkyl group such as a dimethylaminomethyl group, a dimethylaminoethyl group, a dimethylaminopropyl group, or a diethylaminoethyl group.

Examples of the oxygen atom-containing hydrocarbyl group denoted by R' and R" include an alkoxyalkyl group such as a methoxymethyl group, a methoxyethyl group, a methoxypropyl group, an ethoxymethyl group, or an ethoxyethyl group. It is preferably an alkoxyalkyl group, and more preferably an alkoxyalkyl group having 2 to 4 carbon atoms.

Examples of the silicon atom-containing hydrocarbyl group denoted by R' and R" include a trialkylsilylalkyl group such as a trimethylsilylmethyl group.

Examples of the substituted silyl group denoted by R' and R" include a trialkylsilyl group such as a trimethylsilyl group, a triethylsilyl group, or a t-butyldimethylsilyl group. The substituted silyl group is preferably a trialkylsilyl group, and more preferably a trimethylsilyl group.

Examples of the divalent group having 2 to 12 carbon atoms in which R' and R" are bonded to each other include an alkylene group such as a methylene group, an ethylene group, a trimethylene group, a tetramethylene group, a pentamethylene group, or a hexamethylene group; an alkenylene group such as a group represented by —CH═CH—CH═CH—; a nitrogen-containing group such as a group represented by —CH$_2$CH$_2$—NH—CH$_2$—, a group represented by —CH═CH—N═CH—, a group represented by —CH$_2$CH$_2$—N═CH—, a group represented by —CH$_2$CH$_2$CH$_2$—NH—, a group represented by —CH═CHCH═N—, or a group represented by —CH$_2$CH$_2$—NH—CH$_2$CH$_2$—; and an oxygen-containing group such as a group represented by —CH$_2$CH$_2$—O—CH$_2$CH$_2$— or a group represented by —CH$_2$CH$_2$CH$_2$—O—CH$_2$CH$_2$CH$_2$—.

R' and R" are preferably alkyl groups, alkoxyalkyl groups, substituted silyl groups or a divalent group in which R' and R" are bonded to each other, and are more preferably alkyl groups.

As the group represented by formula (Xa), an acyclic amino group and a cyclic amino group can be cited.

Examples of the acyclic amino group include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; a dialkoxyalkylamino group such as a di(methoxyethyl)amino group, a di(ethoxymethyl)amino group, or di(ethoxyethyl)amino group; and a di(trialkylsilyl)amino group such as a di(trimethylsilyl)amino group.

Examples of the cyclic amino group include a 1-polymethyleneimino group such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, or a 1-dodecamethyleneimino group. Furthermore, examples of the cyclic amino group also include a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group, and a morpholino group.

The group represented by formula (Xa) is preferably an acyclic amino group, and more preferably a dialkyl amino group.

At least one of $X^1$, $X^2$, and $X^3$ of formula (X) is a group represented by formula (Xa). It is preferable that two or more of $X^1$, $X^2$, and $X^3$ are a group represented by formula (Xa), and it is more preferable that two of $X^1$, $X^2$, and $X^3$ are a group represented by formula (Xa).

With regard to the compound represented by formula (X), as compounds in which one of $X^1$ to $X^3$ is an acyclic amino group represented by formula (Xa) and two thereof are a hydrocarbyl group or a substituted hydrocarbyl group there can be cited a (dialkylamino)dialkylvinylsilane, a {di(trialkylsilyl)amino}dialkylvinylsilane, and a (dialkylamino)dialkoxyalkylvinylsilane.

Examples of the (dialkylamino)dialkylvinylsilane include (dimethylamino)dimethylvinylsilane, (ethylmethylamino)dimethylvinylsilane, (diethylamino)dimethylvinylsilane, (ethyl-n-propylamino)dimethylvinylsilane, (ethylisopropylamino)dimethylvinylsilane, di(n-propyl)aminodimethylvinylsilane, (diisopropylamino)dimethylvinylsilane, (n-butyl-n-propylamino)dimethylvinylsilane, di(n-butyl)aminodimethylvinylsilane, (dimethylamino)diethylvinylsilane, di(tert-butyl)aminodimethylvinylsilane, (dimethylamino)diethylvinylsilane, (ethylmethylamino)diethylvinylsilane, (diethylamino)diethylvinylsilane, (ethyl-n-propylamino)diethylvinylsilane, (ethylisopropylamino)diethylvinylsilane, di(n-propyl)aminodiethylvinylsilane, (diisopropylamino)diethylvinylsilane, (n-butyl-n-propylamino)diethylvinylsilane, di(n-butyl)aminodiethylvinylsilane, di(tert-butyl)aminodiethylvinylsilane, (dimethylamino)dipropylvinylsilane, (ethylmethylamino)dipropylvinylsilane, (diethylamino)dipropylvinylsilane, (ethyl-n-propylamino)dipropylvinylsilane, (ethylisopropylamino)dipropylvinylsilane, di(n-propyl)aminodipropylvinylsilane, (diisopropylamino)dipropylvinylsilane, (n-butyl-n-propylamino)dipropylvinylsilane, di(n-butyl)aminodipropylvinylsilane, di(tert-butyl)aminodipropylvinylsilane, (dimethylamino)dibutylvinylsilane, (ethylmethylamino)dibutylvinylsilane, (diethylamino)dibutylvinylsilane, (ethyl-n-propylamino)dibutylvinylsilane, (ethylisopropylamino)dibutylvinylsilane, di(n-propyl)aminodibutylvinylsilane, (diisopropylamino)dibutylvinylsilane, (n-butyl-n-propylamino)dibutylvinylsilane, di(n-butyl)aminodibutylvinylsilane and di(tert-butyl)aminodibutylvinylsilane.

Examples of the {di(trialkylsilyl)amino}dialkylvinylsilane include {di(trimethylsilyl)amino}dimethylvinylsilane, {di(t-butyldimethylsilyl)amino}dimethylvinylsilane, {di(trimethylsilyl)amino}diethylvinylsilane, and {di(t-butyldimethylsilyl)amino}diethylvinylsilane.

Examples of the (dialkylamino)dialkoxyalkylvinylsilane include (dimethylamino)dimethoxymethylvinylsilane, (dimethylamino)dimethoxyethylvinylsilane, (dimethylamino)diethoxymethylvinylsilane, (dimethylamino)diethoxyethylvinylsilane, (diethylamino)dimethoxymethylvinylsilane, (diethylamino)dimethoxyethylvinylsilane, (diethylamino)diethoxymethylvinylsilane, and (diethylamino)diethoxyethylvinylsilane.

With regard to the compound represented by formula (X), as a compound in which two of $X^1$ to $X^3$ are acyclic amino groups represented by formula (Xa) and one thereof is a hydrocarbyl group or a substituted hydrocarbyl group there can be cited a bis(dialkylamino)alkylvinylsilane, a bis{di(trialkylsilyl)amino}alkylvinylsilane, a bis(dialkylamino)alkoxyalkylvinylsilane, etc.

Examples of the bis(dialkylamino)alkylvinylsilane include bis(dimethylamino)methylvinylsilane, bis(ethylmethylamino)methylvinylsilane, bis(diethylamino)methylvinylsilane, bis(ethyl-n-propylamino)methylvinylsilane, bis(ethylisopropylamino)methylvinylsilane, bisdi(n-propyl)aminomethylvinylsilane, bis(diisopropylamino)methylvinylsilane, bis(n-butyl-n-propylamino)methylvinylsilane, bisdi(n-butyl)aminomethylvinylsilane, bis(dimethylamino)ethylvinylsilane, bis(ethylmethylamino)ethylvinylsilane, bis(diethylamino)ethylvinylsilane, bis(ethyl-n-propylamino)ethylvinylsilane, bis(ethylisopropylamino)ethylvinylsilane, bisdi(n-propyl)aminoethylvinylsilane, bis(diisopropylamino)ethylvinylsilane, bis(n-butyl-n-propylamino)ethylvinylsilane, bis(di(n-butyl)amino)ethylvinylsilane, bis(dimethylamino)propylvinylsilane, bis(ethylmethylamino)propylvinylsilane, bis(diethylamino)propylvinylsilane, bis(ethyl-n-propylamino)propylvinylsilane, bis(ethylisopropylamino)propylvinylsilane, bisdi(n-propyl)aminopropylvinylsilane, bis(diisopropylamino)propylvinylsilane, bis(n-butyl-n-propylamino)propylvinylsilane, bisdi(n-butyl)aminopropylvinylsilane, bis(dimethylamino)butylvinylsilane, bis(ethylmethylamino)butylvinylsilane, bis(diethylamino)butylvinylsilane, bis(ethyl-n-propylamino)butylvinylsilane, bis(ethylisopropylamino)butylvinylsilane, bisdi(n-propyl)aminobutylvinylsilane, bis(diisopropylamino)butylvinylsilane, bis(n-butyl-n-propylamino)butylvinylsilane, and bisdi(n-butyl)aminobutylvinylsilane.

Examples of the bis{di(trialkylsilyl)amino}alkylvinylsilane include bis{di(trimethylsilyl)amino}methylvinylsilane, bis{di(t-butyldimethylsilyl)amino}methylvinylsilane, bis{di(trimethylsilyl)amino}ethylvinylsilane, and bis{di(t-butyldimethylsilyl)amino}ethylvinylsilane.

Examples of the bis(dialkylamino)alkoxyalkylvinylsilane include bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane.

Examples of the bis(dialkylamino)alkoxyalkylvinylsilane include bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(diethylamino)ethoxyethylvinylsilane.

With regard to the compound represented by formula (X), as compounds in which three of $X^1$ to $X^3$ are acyclic amino groups represented by formula (Xa) there can be cited a tri(dialkylamino)vinylsilane, etc.

Examples thereof include tri(dimethylamino)vinylsilane, tri(ethylmethylamino)vinylsilane, tri(diethylamino)vinylsilane, tri(ethylpropylamino)vinylsilane, tri(dipropylamino)vinylsilane, and tri(butylpropylamino)vinylsilane.

With regard to the compound represented by formula (X), examples of compounds in which two of $X^1$ to $X^3$ are cyclic amino groups represented by formula (Xa) and one thereof is a hydrocarbyl group or a substituted hydrocarbyl group include bis(1-piperidinyl)methylvinylsilane, bis(hexamethyleneimino)methylvinylsilane, bis(4,5-dihydro-1-imidazolyl)methylvinylsilane, and bis(morpholino)methylvinylsilane.

In order to improve abrasion resistance and fuel economy, the content of the constituent unit based on a silicon-containing monomer (monomer unit based on silicon-containing monomer) in the conjugated diene polymer rubber component of component (A) is preferably not less than 0.001 mmol/g and not more than 0.1 mmol/g per unit weight of component (A). It is more preferably not less than 0.002 mmol/g and not more than 0.07 mmol/g. It is yet more preferably not less than 0.003 mmol/g and not more than 0.05 mmol/g.

It is thought that the constituent unit based on a monomer represented by formula (X) turns into a structure represented by formula (Xb) below in a polymer rubber. Furthermore, with regard to the constituent unit based on a monomer represented by formula (X), a group represented by formula (Xa) may become a hydroxy group as a result of hydrolysis, etc.

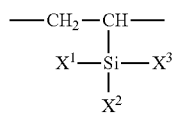

(Xb)

The conjugated diene polymer rubber component of component (A) is modified with a carbonyl group- and substituted amino group-containing compound (hereinafter, also called compound (I)).

The substituted amino group of compound (I) is a group in which one or more hydrogen atoms on the amino group are replaced by a substituent; examples thereof include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; an aralkylamino group such as a benzylamino group; an arylamino group such as a phenylamino group; a diarylamino group such as a diphenylamino group; an alkylideneamino group such as an ethylideneamino group, a 1-methylethylideneamino group, a 2-methylpropylideneamino group, or a 1,3-dimethylbutylideneamino group, and a cyclic amino group such as a 1-aziridinyl group, a 1-azetidinyl group, a 1-pyrrolidinyl group, a 1-piperidinyl group, a 1-hexamethyleneimino group, a 1-heptamethyleneimino group, a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group, or a morpholino group.

As compound (I), formula (Ia) below may be cited,

(Ia)

wherein $Z^1$ and $Z^2$ denote a substituted amino group-containing group, a hydrogen atom, an optionally substituted hydrocarbyl group, or an optionally substituted hydrocarbyloxy group, at least one of $Z^1$ and $Z^2$ is a substituted amino group-containing group, or $Z^1$ and $Z^2$ are bonded to each other and denote a divalent group in which a substituted amino group-containing ring structure in which $Z^1$ and $Z^2$ are bonded is formed by $Z^1$, $Z^2$, and the carbonyl carbon.

As the substituted amino group-containing group, a substituted amino group, a hydrocarbyl group containing a substituted amino group as a substituent, and a hydrocarbyloxy group containing a substituted amino group as a substituent can be cited.

Examples of the substituted amino group include the above-mentioned substituted amino groups. Examples thereof further include an amino group containing a substituted amino group-containing group as a substituent and an amino group containing a hydrocarbyloxy group-containing group as a substituent.

Examples of the amino group containing a substituted amino group-containing group as a substituent include a (dialkylaminoalkyl)amino group such as a (dimethylaminomethyl)amino group, a (dimethylaminoethyl)amino group, a (dimethylaminopropyl)amino group, a (diethylaminopropyl)amino group, or a (dipropylaminopropyl)amino group; and a bis(dialkylaminoalkyl)amino group such as a bis(dimethylaminoethyl)amino group or a bis(dimethylaminopropyl)amino group.

Examples of the amino group containing a hydrocarbyloxy group-containing group as a substituent include an (alkoxyalkyl)amino group such as a (methoxymethyl)amino group, a (methoxyethyl)amino group, a (methoxypropyl)amino group, or an (ethoxymethyl)amino group; an (aryloxyalkyl)amino group such as a (phenoxymethyl)amino group or a (phenoxyethyl)amino group; and an (aralkyloxyalkyl)amino group such as a (benzyloxymethyl)amino group or a (benzyloxyethyl)amino group.

As the hydrocarbyl group containing a substituted amino group as a substituent, a hydrocarbyl group containing a hydrocarbyl-substituted amino group as a substituent can be cited. Examples of the hydrocarbyl group containing a hydrocarbyl-substituted amino group as a substituent include a dialkylaminoalkyl group such as a dimethylaminomethyl group, a dimethylaminoethyl group, or a dimethylaminopropyl group; and a dialkylaminoaryl group such as a dimethylaminophenyl group or a diethylaminophenyl group.

As the hydrocarbyloxy group containing a substituted amino group as a substituent, a hydrocarbyloxy group containing a hydrocarbyl-substituted amino group as a substituent can be cited. Examples of the hydrocarbyloxy group containing a hydrocarbyl-substituted amino group as a substituent include a dialkylaminoalkoxy group such as a dimethylaminomethoxy group, a dimethylaminoethoxy group, or a dimethylaminopropoxy group.

As the substituted amino group-containing group, a group represented by formula (Ib) below can be cited preferably,

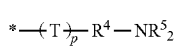
(Ib)

wherein p denotes 0 or 1, T denotes an oxygen atom or —$NR^6$— ($R^6$ denotes a hydrocarbyl group or a hydrogen atom), $R^4$ denotes a hydrocarbylene group, $R^5$ denotes a hydrocarbyl group that may contain a nitrogen atom and/or an oxygen atom (the two $R^5$s may be identical to or different from each other), a group having 2 to 20 carbon atoms in which the two $R^5$s form a single group and are bonded to the nitrogen atom via a double bond, or a divalent group having 2 to 20 carbon atoms in which the two $R^5$s are bonded to each other, and * represents a bonding position.

In the present specification, a hydrocarbylene group denotes a divalent hydrocarbon residue.

In formula (Ib), p denotes 0 or 1.

In formula (Ib), T denotes an oxygen atom or —$NR^6$— ($R^6$ denotes a hydrocarbyl group or a hydrogen atom). Examples of the hydrocarbyl group denoted by $R^6$ include an alkyl group such as a methyl group, an ethyl group, an n-propyl group, an isopropyl group, an n-butyl group, a sec-butyl group, or a tert-butyl group; an aryl group such as a phenyl group, a methylphenyl group, an ethylphenyl group, or a naphthyl group; and an aralkyl group such as a benzyl group.

The number of carbon atoms of the hydrocarbyl group denoted by $R^6$ is preferably from 1 to 10, and more preferably from 1 to 4.

The hydrocarbyl group denoted by $R^6$ is preferably an alkyl group, more preferably an alkyl group having 1 to 4 carbon atoms, and yet more preferably a methyl group or an ethyl group.

$R^6$ is preferably a hydrogen atom or an alkyl group, more preferably a hydrogen atom or an alkyl group having 1 to 4 carbon atoms, yet more preferably a hydrogen atom, a methyl group, or an ethyl group, and yet more preferably a hydrogen atom or a methyl group.

$R^4$ in formula (Ib) denotes a hydrocarbylene group, and examples of the hydrocarbylene group include an alkylene group such as a methylene group, an ethylene group, a trimethylene group, a tetramethylene group, a pentamethylene group, or a hexamethylene group; an arylene group such as a phenylene group, a tolylene group, or a xylylene group; and an aralkylene group.

The number of carbon atoms of $R^4$ of formula (Ib) is preferably from 1 to 10, and more preferably from 2 to 4.

$R^5$ of formula (Ib) denotes a hydrocarbyl group that may contain a nitrogen atom and/or an oxygen atom (the two $R^5$s may be identical to or different from each other), a group having 2 to 20 carbon atoms in which the two $R^5$s form a single group and are bonded to the nitrogen atom via a double bond, or a divalent group having 2 to 20 carbon atoms in which the two $R^5$s are bonded to each other.

Examples of the hydrocarbyl group denoted by $R^5$ include an alkyl group such as a methyl group, an ethyl group, an n-propyl group, an isopropyl group, a n-butyl group, a sec-butyl group, or a tert-butyl group; an aryl group such as a phenyl group, a methylphenyl group, or an ethylphenyl group; and an aralkyl group such as a benzyl group. The number of carbon atoms of the hydrocarbyl group denoted by $R^5$ is preferably from 1 to 10, more preferably from 1 to 6, and yet more preferably from 1 to 4.

Examples of the nitrogen atom-containing hydrocarbyl group denoted by $R^5$ include a dialkylaminoalkyl group such as a dimethylaminomethyl group, a dimethylaminoethyl group, a dimethylaminopropyl group, or a diethylaminoethyl group. The number of carbon atoms of the nitrogen atom-containing hydrocarbyl group denoted by $R^5$ is preferably from 3 to 10, more preferably from 3 to 6, and yet more preferably from 3 to 4.

Examples of the oxygen atom-containing hydrocarbyl group denoted by $R^5$ include an alkoxyalkyl group such as a methoxymethyl group, a methoxyethyl group, a methoxypropyl group, an ethoxymethyl group, or an ethoxyethyl group; an oxacycloalkyl group such as an oxiranyl group or a tetrahydrofuranyl group; and an oxacycloalkylalkyl group such as a glycidyl group or a tetrahydrofurfuryl group. The number of carbon atoms of the oxygen atom-containing hydrocarbyl group denoted by $R^5$ is preferably from 2 to 10, more preferably from 2 to 6, and yet more preferably from 2 to 4.

In the present specification, the oxacycloalkyl group denotes a group in which $CH_2$ on the alicyclic ring of a cycloalkyl group is replaced by an oxygen atom, and the oxacycloalkylalkyl group denotes a group in which a hydrogen atom of an alkyl group is replaced by an oxacycloalkyl group.

As the single group denoted by the two $R^5$s in which they bond to the nitrogen atom via a double bond, a divalent group that may contain at least one atom selected from the group consisting of a nitrogen atom and an oxygen atom can be cited. Examples thereof include an ethylidene group, a propylidene group, a butylidene group, a 1-methylethylidene group, a 1-methylpropylidene group, a 1,3-dimethylbutylidene group, a benzylidene group, and a 4-N,N-dimethylaminobenzylidene group. The number of carbon atoms of the single group denoted by the two $R^5$s in which they bond to the nitrogen atom via a double bond is from 2 to 20, preferably from 2 to 12, and more preferably from 2 to 8.

Examples of the divalent group having 2 to 20 carbon atoms in which the two $R^5$s are bonded to each other include an alkylene group such as an ethylene group, a trimethylene group, a tetramethylene group, a pentamethylene group, or a hexamethylene group; an alkenylene group such as a group represented by —CH=CH—CH=CH—; a nitrogen-containing group such as a group represented by —$CH_2CH_2$—NH—$CH_2$—, a group represented by —CH=CH—N=CH—, a group represented by —$CH_2CH_2$—N=CH—, a group represented by —$CH_2CH_2CH_2$—NH—, a group represented by —CH=CHCH=N—, or a group represented by —$CH_2CH_2$—NH—$CH_2CH_2$—; and an oxygen-containing group such as a group represented by —$CH_2CH_2$—O—$CH_2CH_2$— or a group represented by —$CH_2CH_2CH_2$—O—$CH_2CH_2CH_2$—. The number of carbon atoms of the divalent group in which the two $R^5$s are bonded to each other is preferably from 2 to 12, and more preferably from 2 to 8.

As the optionally substituted hydrocarbyl group denoted by $Z^1$ and $Z^2$ of formula (Ia), a hydrocarbyl group and a hydrocarbyl group containing a hydrocarbyloxy group as a substituent can be cited. Examples of the hydrocarbyl group include an alkyl group such as a methyl group, an ethyl group, an n-propyl group, an isopropyl group, or an n-butyl group; a cycloalkyl group such as a cyclohexyl group; an aryl group such as a phenyl group, a methylphenyl group, or an ethylphenyl group; an aralkyl group such as a benzyl group; an alkenyl group such as a vinyl group, a 1-propenyl group, an allyl group, an isopropenyl group, a crotyl group, an isocrotyl group, or a methallyl group; and an alkynyl group such as a propargyl group.

Examples of the hydrocarbyl group containing a hydrocarbyloxy group as a substituent include an alkoxyalkyl group such as a methoxymethyl group, a methoxyethyl group, a methoxypropyl group, or an ethoxymethyl group; an aryloxyalkyl group such as a phenoxymethyl group or a phenoxyethyl group; and an aralkyloxyalkyl group such as a benzyloxymethyl group or a benzyloxyethyl group.

The optionally substituted hydrocarbyl group is preferably a hydrocarbyl group, and more preferably a hydrocarbyl group having 1 to 4 carbon atoms. The hydrocarbyl group is preferably an alkyl group or an alkenyl group.

As the optionally substituted hydrocarbyloxy group denoted by $Z^1$ and $Z^2$ of formula (Ia), a hydrocarbyloxy group and a hydrocarbyloxy group containing a hydrocarbyloxy group as a substituent can be cited.

Examples of the hydrocarbyloxy group include an alkoxy group such as a methoxy group, an ethoxy group, an n-propoxy group, an isopropoxy group, or a butoxy group; an aryloxy group such as a phenoxy group, a methylphenoxy group, or an ethylphenoxy group; and an aralkyloxy group such as a benzyloxy group.

Examples of the hydrocarbyloxy group containing a hydrocarbyloxy group as a substituent include an alkoxyalkoxy group such as a methoxymethoxy group, a methoxyethoxy group, a methoxypropoxy group, or an ethoxymethoxy group; an aryloxyalkoxy group such as a phenoxymethoxy group or a phenoxyethoxy group; and an aralkyloxyalkoxy group such as a benzyloxymethoxy group or a benzyloxyethoxy group.

The optionally substituted hydrocarbyloxy group is preferably a hydrocarbyloxy group, and more preferably a hydrocarbyloxy group having 1 to 4 carbon atoms. The hydrocarbyloxy group is preferably an alkoxy group.

Examples of the divalent group in which $Z^1$ and $Z^2$ of formula (Ia) are bonded to each other and a substituted amino group-containing ring structure in which $Z^1$ and $Z^2$ are bonded is formed by $Z^1$, $Z^2$, and the carbonyl carbon include a group represented by —$CH_2CH_2CH_2$—$N(C_6H_5)$—, a group represented by —$CH_2CH_2CH_2CH_2CH_2$—$N(CH_3)$—, a group represented by —$N(CH_3)$—$CH_2CH_2$—$N(CH_3)$—, a group represented by —$CH_2$—$N(CH_2CH_3)$—$CH_2CH_2CH_2$—, and a group represented by —$CH_2CH_2C$(=O)—NH—.

Examples of compounds represented by formula (Ia) include carboxylic acid amide compounds and carboxylic acid ester compounds.

Examples of the carboxylic acid amide compound include a formamide compound such formamide, N,N-dimethylformamide, or N,N-diethylformamide; an acetamide compound such as N,N-dimethylacetamide, N,N-diethylacetamide, amino aceta mid e, N,N-dimethyl-N',N'-dimethylaminoacetamide, N,N-dimethylaminoacetamide, N,N-dimethyl-N'-ethylaminoacetamide, N,N-dimethylaminoacetamide, or N-phenyldiacetamide;
a propionamide compound such as propionamide or N,N-di methyl prop ion amid e;
a pyridylamide compound such as 4-pyridylamide or N,N-dimethyl-4-pyridylamide;
a benzamide compound such as benzamide, N,N-dimethylbenzamide, N',N'-(p-dimethylamino)benzamide, N',N'-(p-diethylamino)benzamide, N,N-dimethyl-N',N'-(p-dimethylamino)benzamide, or N,N-dimethyl-N',N'-(p-diethylamino)benzamide;
a pyridylamide compound such as N,N-dimethyl-4-pyridylamide; and
a phthalamide compound such as N,N,N',N'-tetramethylphthalamide or N,N,N',N'-tetraethylphthalamide.

Examples of the carboxylic acid ester compounds include
an N,N-dialkylaminomethyl acetate such as N,N-dimethylaminomethyl acetate or N,N-diethylaminomethyl acetate;
an N,N-dialkylaminoethyl acetate such as N,N-dimethylaminoethyl acetate or N,N-diethylaminoethyl acetate;
an N,N-dialkylaminopropyl acetate such as N,N-dimethylaminopropyl acetate or N,N-diethylaminopropyl acetate; and
an N,N-dialkylaminoethylbenzoate such as N,N-dimethylaminoethylbenzoate or N,N-diethylaminoethylbenzoate.

As a preferred compound represented by formula (Ia), a compound in which at least one of $Z^1$ and $Z^2$ is a group represented by formula (Ib) can be cited.

Examples of the compound include a compound represented by formula (I-1) below and a compound represented by formula (I-2) below, for which p of formula (Ib) is 0,

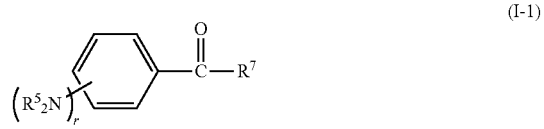

(I-1)

wherein r denotes 1 or 2, $R^5_2N$— is a substituent on the benzene ring, $R^5$ denotes a hydrocarbyl group that may contain a nitrogen atom and/or an oxygen atom (the two $R^5$s may be identical to or different from each other), a group having 2 to 20 carbon atoms in which the two $R^5$s form a single group and are bonded to the nitrogen atom via a double bond, or a divalent group having 2 to 20 carbon atoms in which the two $R^5$s are bonded to each other, and $R^7$ denotes a hydrocarbyl group or a hydrogen atom,

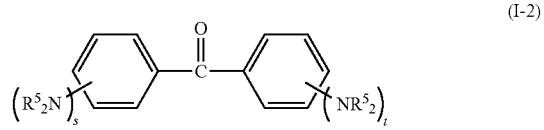

(I-2)

wherein s denotes 1 or 2, t denotes a number from 0 to 2, $R^5_2N$— denotes a substituent on a benzene ring, and $R^5$ denotes a hydrocarbyl group that may contain a nitrogen atom and/or an oxygen atom (the two $R^5$s may be identical to or different from each other), a group having 2 to 20 carbon atoms in which the two $R^5$s form a single group and are bonded to the nitrogen atom via a double bond, or a divalent group having 2 to 20 carbon atoms in which the two $R^5$s are bonded to each other.

r of formula (I-1) denotes 1 or 2, s of formula (I-2) denotes 1 or 2, and t denotes a number from 0 to 2.

$R^5_2N$— of formula (I-1) and formula (I-2) is a substituent on a benzene ring. When r, s, and t are 2, it means that two $R^5_2N$-s are bonded to a benzene ring. The definition, examples, and preferred groups for $R^5$ are the same as the definition, examples, and preferred groups described for $R^5$ of formula (Ib).

$R^5_2N$— of formula (I-1) and formula (I-2) is preferably a dialkylamino group. The alkyl groups of the dialkylamino group are preferably alkyl groups having 1 to 4 carbon atoms.

$R^7$ of formula (I-1) denotes a hydrogen atom or a hydrocarbyl group. Examples of the hydrocarbyl group include an alkyl group such as a methyl group, an ethyl group, an n-propyl group, an isopropyl group, an n-butyl group, a sec-butyl group, or a tert-butyl group; an aryl group such as a phenyl group, a methylphenyl group, or an ethylphenyl group; and an aralkyl group such as a benzyl group.

Examples of the compound represented by formula (I-1) include a dialkylamino-substituted benzaldehyde compound such as 4-dimethylaminobenzaldehyde, 4-diethylaminobenzaldehyde, or 3,5-bis(dihexylamino)benzaldehyde; a dialkylamino-substituted acetophenone compound such as 4-dimethylaminoacetophenone or 4-diethylaminoacetophenone; a heterocyclic group-substituted acetophenone compound such as 4'-(1-imidazolyl)acetophenone, 4'-(1-pyrazolyl)acetophenone, or, 4-morpholinoacetophenone.

Examples of the compound represented by formula (I-2) include dimethylaminobenzophenone, compound such as 3-dimethylaminobenzophenone, 3-diethylaminobenzophenone, or 4-dimethylaminobenzophenone, 4-diethylaminobenzophenone, or 4,4'-bis(dimethylamino)benzophenone, 4,4'-bis(diethylamino)benzophenone; a heterocyclic group-substituted benzophenone compound such as 4'-(imidazol-1-yl)benzophenone, 4'-(1-pyrazolyl)benzophenone, 4-morpholinobenzophenone.

As a preferred compound of formula (Ia) in which at least one of $Z^1$ and $Z^2$ is a group represented by formula (Ib), a compound represented by formula (I-3) below for which p of formula (Ib) is 1 can be cited,

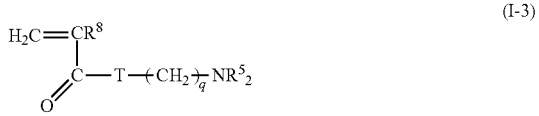

(I-3)

wherein $R^5$ denotes a hydrocarbyl group that may contain a nitrogen atom and/or an oxygen atom (the two $R^5$s may be identical to or different from each other), a group having 2 to 20 carbon atoms in which the two $R^5$s form a single group and are bonded to the nitrogen atom via a double bond, or a divalent group having 2 to 20 carbon atoms in which the two $R^5$s are bonded to each other, q denotes an integer from 1 to 10, T denotes an oxygen atom or —$NR^6$— ($R^6$ denotes a hydrocarbyl group or a hydrogen atom), and $R^8$ denotes an optionally substituted hydrocarbyl group or a hydrogen atom.

The definition, examples, and preferred groups for $R^5$ of formula (I-3) are the same as the definition, examples, and preferred groups described for $R^5$ of formula (Ib). In formula (I-3), $R^5$ is more preferably a group for which —$NR^5_2$ is an acyclic amino group, yet more preferably an alkyl group, an oxacycloalkyl group, or an oxacycloalkylalkyl group, and yet more preferably an alkyl group.

q of formula (I-3) denotes a number from 1 to 10. It is preferably a number from 2 to 4.

T of formula (I-3) denotes an oxygen atom or —$NR^6$— ($R^6$ denotes a hydrocarbyl group or a hydrogen atom), and the definition, examples, and preferred groups for $R^6$ are the same as the definition, examples, and preferred groups described for $R^6$ of formula (Ib). In formula (I-3), $R^6$ is more preferably a hydrogen atom.

$R^8$ of formula (I-3) denotes an optionally substituted hydrocarbyl group or a hydrogen atom. Examples of the hydrocarbyl group include an alkyl group such as a methyl group, an ethyl group, an n-propyl group, an isopropyl group, an n-butyl group, a sec-butyl group, or a tert-butyl group; an aryl group such as a phenyl group, a methylphenyl group, or an ethylphenyl group; and an aralkyl group such as a benzyl group. The hydrocarbyl group is preferably an alkyl group, and more preferably an alkyl group having 1 to 4 carbon atoms.

Examples of the substituted hydrocarbyl group denoted by $R^8$ of formula (I-3) include an alkoxyalkyl group such as a methoxymethyl group, a methoxyethyl group, an ethoxymethyl group, or an ethoxyethyl group.

The substituted hydrocarbyl group is preferably an alkoxyalkyl group, and more preferably alkoxyalkyl group having 2 to 4 carbon atoms.

Examples of the compound represented by formula (I-3) include acrylamide compounds (T: NH, $R^8$: H) below.
N-(2-di methylaminoethyl)acrylamide,
N-(2-diethylaminoethyl)acrylamide,
N-(3-dimethylaminopropyl)acrylamide,
N-(3-diethylaminopropyl)acrylamide,
N-(4-di methylaminobutyl)acrylamide,
N-(4-diethylaminobutyl)acrylamide,
N-(3-di(glycidyl)aminopropyl)acrylamide,
N-(3-di(tetrahydrofurfuryl)aminopropyl)acrylamide, and
N-(3-morpholinopropyl)acrylamide.

Examples of the compound represented by formula (I-3) include methacrylamide compounds (T: NH, $R^8$: $CH_3$) below.
N-(2-di methylaminoethyl)methacrylamide,
N-(2-diethylaminoethyl)methacrylamide,
N-(3-dimethylaminopropyl)methacrylamide,
N-(3-diethylaminopropyl)methacrylamide,
N-(4-dimethylaminobutyl)methacrylamide,
N-(4-diethylaminobutyl)methacrylamide,
N-(3-di(glycidyl)aminopropyl) methacrylamide,
N-(3-di(tetrahydrofurfuryl)aminopropyl) methacrylamide, and
N-(3-morpholinopropyl)methacrylamide.

Examples of the compound represented by formula (I-3) include methacrylamide compounds (T: O, $R^8$: H) below.
2-di methylaminoethyacrylate,
2-diethylaminoethylacrylate,
3-di methylaminopropylacrylate,
3-diethylaminopropylacrylate,
4-dimethylaminobutylacrylate,
4-diethylaminobutylacrylate,
3-di(glycidyl)aminopropylacrylate, and
3-di(tetrahydrofurfuryl)aminopropylacrylate.

Examples of the compound represented by formula (I-3) include methacrylamide compounds (T: O, $R^8$: $CH_3$) below.
2-dimethylaminoethyl methacrylate,
2-diethylaminoethyl methacrylate,
3-dimethylaminopropyl methacrylate,
3-diethylaminopropyl methacrylate,
4-dimethylaminobutyl methacrylate,
4-diethylaminobutyl methacrylate,
3-di(glycidyl)aminopropylmethacrylate, and
3-di(tetrahydrofurfuryl)aminopropylmethacrylate.

The compound represented by formula (I-3) is preferably an acrylamide compound (T: NH, $R^8$: H) or a methacrylamide compound (T: NH, $R^8$: $CH_3$), more preferably an N-(3-dialkylaminopropyl)acrylamide or an N-(3-dialkylaminopropyl)methacrylamide, and yet more preferably N-(3-dimethylaminopropyl)acrylamide, N-(3-diethylaminopropyl)acrylamide, N-(3-di methylaminopropyl)methacrylamide, or N-(3-diethylaminopropyl)methacrylamide.

With regard to the compound represented by formula (Ia), as the compound in which $Z^1$ and $Z^2$ form a group in which $Z^1$ and $Z^2$ are bonded to each other and a substituted amino group-containing ring structure is formed by $Z^1$, $Z^2$, and the carbonyl carbon, a compound represented by formula (I-4) below and a compound represented by formula (I-5), which is described later, can be cited.

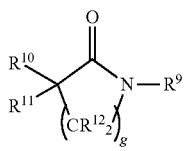

(I-4)

wherein g denotes a number from 0 to 10, $R^9$ denotes an optionally substituted hydrocarbyl group, $R^{10}$, $R^{11}$, and $R^{12}$ denote a hydrogen atom or a hydrocarbyl group, and the plurality of $R^{12}$s may be identical to or different from each other.

$R^9$ of formula (I-4) denotes an optionally substituted hydrocarbyl group. Examples of the hydrocarbyl group denoted by $R^9$ include an alkyl group such as a methyl group, an ethyl group, an n-propyl group, an isopropyl group, an n-butyl group, a sec-butyl group, or a tert-butyl group; an aryl group such as a phenyl group, a methylphenyl group, an ethylphenyl group, or a naphthyl group; and an aralkyl group such as a benzyl group. The number of carbon atoms of the hydrocarbyl group is preferably from 1 to 20.

Examples of the substituted hydrocarbyl group denoted by $R^9$ of formula (I-4) include a dialkylaminoalkyl group such as a dimethylaminoethyl group or a diethylaminoethyl group; and an alkoxyalkyl group such as a methoxymethyl group, a methoxyethyl group, an ethoxymethyl group, or an ethoxyethyl group. The number of carbon atoms of the substituted hydrocarbyl group is preferably from 1 to 20.

$R^9$ of formula (I-4) is preferably a hydrocarbyl group, and more preferably an alkyl group or an aryl group.

$R^{10}$ and $R^{11}$ of formula (I-4) denote a hydrogen atom or a hydrocarbyl group. Examples of the hydrocarbyl group include an alkyl group such as a methyl group, an ethyl group, an n-propyl group, an isopropyl group, an n-butyl group, a sec-butyl group, or a tert-butyl group; an aryl group such as a phenyl group, a methylphenyl group, an ethylphenyl group, or a naphthyl group; and an aralkyl group such as a benzyl group. The number of carbon atoms of the hydrocarbyl group is preferably from 1 to 20.

$R^{10}$ and $R^{11}$ of formula (I-4) are preferably hydrogen atoms, alkyl groups, or aryl groups, and more preferably hydrogen atoms.

g of formula (I-4) denotes a number from 0 to 10. It is preferably a number from 2 to 7.

$R^{12}$ of formula (I-4) denotes a hydrogen atom or a hydrocarbyl group. Examples of the hydrocarbyl group include an alkyl group such as a methyl group, an ethyl group, an n-propyl group, an isopropyl group, an n-butyl group, a sec-butyl group, or a tert-butyl group.

$R^{12}$ of formula (I-4) is preferably a hydrogen atom or an alkyl group, and more preferably a hydrogen atom.

Examples of the compound of formula (I-4) include a β-propiolactam compound such as N-methyl-β-propiolactam, N-(tert-butyl)-β-propiolactam, or N-phenyl-β-propiolactam;
a 2-pyrrolidone compound such as 1-methyl-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(tert-butyl)-5-methyl-2-pyrrolidone, or 1-(tert-butyl)-3,3-dimethyl-2-pyrrolidone;
a 2-piperidone compound such as 1-(tert-butyl)-2-piperidone, 1-phenyl-2-piperidone, 1-(p-methylphenyl)-2-piperidone, or 1-naphthyl-2-piperidone;
an ε-caprolactam compound such as N-methyl-ε-caprolactam, N-ethyl-ε-caprolactam, N-(n-propyl)-ε-caprolactam, N-phenyl-ε-caprolactam, N-(p-methoxyphenyl)-ε-caprolactam, or N-benzyl-ε-caprolactam; and
a ω-laurolactam compound such as N-phenyl-ω-laurolactam.

The compound represented by formula (I-4) is preferably a 2-pyrrolidone compound or an ε-caprolactam compound, more preferably a 1-hydrocarbyl-substituted 2-pyrrolidone or an N-hydrocarbyl-substituted ε-caprolactam, and yet more preferably a 1-alkyl-substituted 2-pyrrolidone, a 1-aryl-substituted 2-pyrrolidone, an N-alkyl-substituted ε-caprolactam, or an N-aryl-substituted ε-caprolactam.

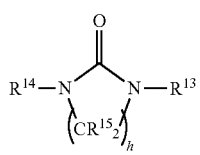

(I-5)

wherein h denotes a number from 0 to 10, $R^{13}$ and $R^{14}$ denote an optionally substituted hydrocarbyl group, $R^{15}$ denotes a hydrogen atom or a hydrocarbyl group, and the plurality of $R^{15}$s may be identical to or different from each other.

$R^{13}$ and $R^{14}$ of formula (I-5) denote an optionally substituted hydrocarbyl group. Examples of the hydrocarbyl group denoted by $R^{13}$ and $R^{14}$ include an alkyl group such as a methyl group, an ethyl group, an n-propyl group, an isopropyl group, an n-butyl group, a sec-butyl group, or a tert-butyl group; an aryl group such as a phenyl group, a methylphenyl group, an ethylphenyl group, or a naphthyl group; and an aralkyl group such as a benzyl group. The number of carbon atoms of the hydrocarbyl group is preferably from 1 to 20.

Examples of the substituted hydrocarbyl group denoted by $R^{13}$ and $R^{14}$ of formula (I-5) include a dialkylaminoalkyl group such as a dimethylaminoethyl group or a diethylaminoethyl group; and an alkoxyalkyl group such as a methoxymethyl group, a methoxyethyl group, an ethoxymethyl group, or an ethoxyethyl group. The number of carbon atoms of the substituted hydrocarbyl group is preferably from 1 to 20.

$R^{13}$ and $R^{14}$ of formula (I-5) are preferably hydrocarbyl groups, more preferably alkyl groups or aryl groups, and yet more preferably alkyl groups.

h of formula (I-5) denotes a number from 0 to 10. It is preferably a number from 2 to 7.

$R^{15}$ of formula (I-5) denotes a hydrogen atom or a hydrocarbyl group. Examples of the hydrocarbyl group include an alkyl group such as a methyl group, an ethyl group, an n-propyl group, an isopropyl group, an n-butyl group, a sec-butyl group, or a tert-butyl group.

$R^{15}$ of formula (I-5) is preferably a hydrogen atom or an alkyl group, and more preferably a hydrogen atom.

Examples of the compound represented by formula (I-5) include a 1,3-hydrocarbyl-substituted 2-imidazolidinone such as 1,3-dimethyl-2-imidazolidinone, 1,3-diethyl-2-imidazolidinone, 1,3-di(n-propyl)-2-imidazolidinone, 1,3-di(tert-butyl)-2-imidazolidinone, or 1,3-diphenyl-2-imidazolidinone.

The compound represented by formula (I-5) is preferably a 1,3-substituted 2-imidazolidinone, more preferably a 1,3-hydrocarbyl-substituted 2-imidazolidinone, and yet more preferably a 1,3-dialkyl-2-imidazolidinone. The 1,3-dialkyl-2-imidazolidinone is preferably 1,3-dimethyl-2- imidazolidinone, 1,3-diethyl-2-imidazolidinone, or 1,3-di(n-propyl)-2-imidazolidinone, and more preferably 1,3-dimethyl-2-imidazolidinone.

Component (B)

Component (B) is a conjugated diene polymer rubber component modified with a compound represented by formula (IIa) below,

$$(R^{21}O)_m Si(R^{22}A)_n R^{23}{}_{4-m-n} \quad \text{(IIa)}$$

wherein m denotes a number from 1 to 3, n denotes a number from 1 to 3, m+n is from 2 to 4, $R^{21}$ and $R^{23}$ denote a hydrocarbyl group, $R^{22}$ denotes a hydrocarbylene group, A denotes a substituted amino group or an optionally substituted hydrocarbyloxy group, when there are a plurality of $R^{21}$s the plurality of $R^{21}$s may be identical to or different from each other, when there are a plurality of $R^{22}$s the plurality of $R^{22}$s may be identical to or different from each other, when there are a plurality of $R^{23}$s the plurality of $R^{23}$s may be identical to or different from each other, and when there are a plurality of As the plurality of As may be identical to or different from each other.

A conjugated diene polymer rubber component in component (B) contains a conjugated diene unit. Examples of the conjugated diene include 1,3-butadiene, isoprene, 1,3-pentadiene, 2,3-dimethyl-1,3-butadiene, and 1,3-hexadiene, and one or more types thereof may be used. The conjugated diene is preferably 1,3-butadiene or isoprene.

The conjugated diene polymer rubber component of component (B) may further comprise, in addition to the conjugated diene-based constituent unit (conjugated diene unit), a constituent unit based on another monomer. Examples of said other monomer include an aromatic vinyl, a vinylnitrile, and an unsaturated carboxylic acid ester. Examples of the aromatic vinyl include styrene, a-methylstyrene, vinyltoluene, vinylnaphthalene, divinylbenzene, trivinylbenzene, and divinylnaphthalene. Examples of the vinylnitrile include acrylonitrile, and examples of the unsaturated carboxylic acid ester include methyl acrylate, ethyl acrylate, methyl methacrylate, and ethyl methacrylate. Among them, an aromatic vinyl is preferable, and styrene is more preferable.

In order to increase the strength, the conjugated diene polymer of component (B) preferably contains an aromatic vinyl unit, and the content of the aromatic vinyl unit, relative to 100% by weight of the total amount of the conjugated diene unit and the aromatic vinyl unit, is preferably at least 10% by weight (the content of the conjugated diene unit being no greater than 90% by weight), and more preferably at least 15% by weight (the content of the conjugated diene unit being no greater than 85% by weight). Furthermore, from the viewpoint of fuel economy, the content of the aromatic vinyl unit is preferably no greater than 50% by weight (the content of the conjugated diene unit being at least 50% by weight), and more preferably no greater than 45% by weight (the content of the conjugated diene unit being at least 55% by weight).

In order to improve abrasion resistance and fuel economy, the conjugated diene polymer rubber component of component (B) preferably contains a constituent unit based on a silicon-containing monomer. The silicon-containing monomer is preferably a monomer represented by formula (X). The monomer represented by formula (X) is as explained for component (A).

In order to improve abrasion resistance and fuel economy, the content of the constituent unit based on a silicon-containing monomer in the conjugated diene polymer rubber component of component (B) is preferably not less than 0.001 mmol/g and not more than 0.1 mmol/g per unit weight of component (B). It is more preferably not less than 0.002 mmol/g and not more than 0.07 mmol/g. It is yet more preferably not less than 0.003 mmol/g and not more than 0.05 mmol/g.

The conjugated diene polymer rubber component of component (B) is modified with the above-mentioned compound represented by formula (IIa) (hereinafter, also called compound (II)).

m of formula (IIa) denotes a number from 1 to 3. It is preferably a number from 2 to 3, and more preferably 3.

n of formula (IIa) denotes a number from 1 to 3. It is preferably a number from 1 to 2, and more preferably 1. m+n is a number from 2 to 4, preferably from 3 to 4, and more preferably 4.

$R^{21}$ and $R^{23}$ of formula (IIa) denote a hydrocarbyl group. Examples of the hydrocarbyl group include an alkyl group such as a methyl group, an ethyl group, an n-propyl group, an isopropyl group, an n-butyl group, a sec-butyl group, or a tert-butyl group; an aryl group such as a phenyl group, a methylphenyl group, an ethylphenyl group, or a naphthyl group; and an aralkyl group such as a benzyl group. The hydrocarbyl group is preferably an alkyl group.

The number of carbon atoms of the hydrocarbyl group denoted by $R^{21}$ and $R^{23}$ is preferably from 1 to 4, more preferably from 1 to 3, and yet more preferably 1 or 2.

$R^{22}$ of formula (IIa) denotes a hydrocarbylene group. Examples of the hydrocarbylene group include an alkylene group such as a methylene group, an ethylene group, a trimethylene group, a tetramethylene group, a pentamethylene group, or a hexamethylene group; an arylene group such as a phenylene group, a tolylene group, or a xylylene group; and an aralkylene group. The hydrocarbylene group is preferably a straight-chain alkylene group.

The number of carbon atoms of $R^{22}$ of formula (Ib) is preferably from 1 to 10, and more preferably from 2 to 4.

A of formula (IIa) denotes a substituted amino group or an optionally substituted hydrocarbyloxy group. As the substituted amino group, a group represented by formula (IIb) can be cited. As the optionally substituted hydrocarbyloxy group, a group represented by formula (IIc), which is described later, can be cited.

wherein $R^{24}$ and $R^{25}$ denote a hydrocarbyl group that may contain at least one atom selected from the group consisting of a nitrogen atom, an oxygen atom, and a silicon atom, a substituted silyl group, a group having 2 to 20 carbon atoms in which $R^{24}$ and $R^{25}$ form a single group and are bonded to the nitrogen atom via a double bond, or a divalent group having 2 to 20 carbon atoms in which $R^{24}$ and $R^{25}$ are bonded to each other, and * represents a bonding position.

Examples of the hydrocarbyl group denoted by $R^{24}$ and $R^{25}$ include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; an aryl group such as a phenyl group, a methylphenyl group, or an ethylphenyl group; and an aralkyl group such as a benzyl group. It is preferably an alkyl group.

The number of carbon atoms of the hydrocarbyl group denoted by $R^{24}$ and $R^{25}$ is preferably from 1 to 10, more preferably from 1 to 6, and yet more preferably from 1 to 4.

Examples of the nitrogen atom-containing hydrocarbyl group denoted by $R^{24}$ and $R^{25}$ include a dialkylaminoalkyl group such as a dimethylaminomethyl group, a dimethylaminoethyl group, a dimethylaminopropyl group, or a diethylaminoethyl group.

The number of carbon atoms of the nitrogen atom-containing hydrocarbyl group denoted by $R^{24}$ and $R^{25}$ is preferably from 3 to 10, more preferably from 3 to 6, and yet more preferably from 3 to 4.

Examples of the oxygen atom-containing hydrocarbyl group denoted by $R^{24}$ and $R^{25}$ include an alkoxyalkyl group such as a methoxymethyl group, a methoxyethyl group, a methoxypropyl group, an ethoxymethyl group, or an ethoxyethyl group; an oxacycloalkyl group such as an oxiranyl group or a tetrahydrofuranyl group; and an oxacycloalkylalkyl group such as a glycidyl group or a tetrahydrofurfuryl group. It is preferably an oxacycloalkyl group or an oxacycloalkylalkyl group.

The number of carbon atoms of the oxygen atom-containing hydrocarbyl group denoted by $R^{24}$ and $R^{25}$ is preferably from 2 to 10, more preferably from 2 to 6, and yet more preferably from 2 to 4.

Examples of the silicon atom-containing hydrocarbyl group denoted by $R^{24}$ and $R^{25}$ include a trialkylsilylalkyl group such as a trimethylsilylmethyl group.

The number of carbon atoms of the silicon atom-containing hydrocarbyl group denoted by $R^{24}$ and $R^{25}$ is preferably from 4 to 10, more preferably from 4 to 6, and yet more preferably 4.

Examples of the substituted silyl group denoted by $R^{24}$ and $R^{25}$ include a trialkylsilyl group such as a trimethylsilyl group, a triethylsilyl group, or a t-butyldimethylsilyl group; and a trialkoxysilyl group such as a trimethoxysilyl group. It is preferably a trialkylsilyl group.

The number of carbon atoms of the substituted silyl group denoted by $R^{24}$ and $R^{25}$ is preferably from 3 to 10, more preferably from 3 to 6, and yet more preferably 3.

As the single group denoted by the $R^{24}$ and $R^{25}$ in which they bond to the nitrogen atom via a double bond, a divalent group that may contain at least one atom selected from the group consisting of a nitrogen atom and an oxygen atom can be cited. Examples thereof include an ethylidene group, a propylidene group, a butylidene group, a 1-methylethylidene group, a 1-methylpropylidene group, a 1,3-dimethylbutylidene group, a benzylidene group, and a 4-N,N-dimethylaminobenzylidene group. The number of carbon atoms of the single group denoted by the two $R^{24}$ and $R^{25}$ in which they bond to the nitrogen atom via a double bond is from 2 to 20, preferably from 2 to 12, and more preferably from 2 to 8.

Examples of the divalent group having 2 to 20 carbon atoms in which the $R^{24}$ and $R^{25}$ are bonded to each other include an alkylene group such as a methylene group, an ethylene group, a trimethylene group, a tetramethylene group, a pentamethylene group, or a hexamethylene group; an alkenylene group such as a group represented by —CH=CH—CH=CH—; a nitrogen-containing group such as a group represented by —CH$_2$CH$_2$—NH—CH$_2$—, a group represented by —CH=CH—N=CH—, a group represented by —CH$_2$CH$_2$—N=CH—, a group represented by —CH$_2$CH$_2$CH$_2$—NH—, a group represented by —CH=CHCH=N—, or a group represented by —CH$_2$CH$_2$—NH—CH$_2$CH$_2$—; and an oxygen-containing group such as a group represented by —CH$_2$CH$_2$—O—CH$_2$CH$_2$— or a group represented by —CH$_2$CH$_2$CH$_2$—O—CH$_2$CH$_2$CH$_2$—. The number of carbon atoms of the divalent group in which the $R^{24}$ ad $R^{25}$ are bonded to each other is preferably from 2 to 12, and more preferably from 2 to 8.

As the group represented by formula (IIb), an acyclic amino group and a cyclic amino group can be cited.

Examples of the acyclic amino group include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group, or an ethylmethylamino group; a di(alkoxyalkyl)amino group such as a di(methoxymethyl)amino group, a di(methoxyethyl)amino group, a di(ethoxymethyl)amino group, or a di(ethoxyethyl)amino group; and a di(trialkylsilyl)amino group such as a di(trimethylsilyl)amino group or a di(t-butyldimethylsilyl)amino group. Further examples thereof include a di(oxacycloalkyle)amino group such as di(oxiranyl)amino group or a di(tetrahydrofuranyl)amino group; and a di(oxacycloalkylalkyl)amino group such as a di(glycidyl) amino group or a di(tetrahydrofurfuryl)amino group. Yet further examples thereof include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino group include a 1-polymethyleneimino group such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, or a 1-dodecamethyleneimino group. Furthermore, examples of the cyclic amino group also include a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group, and a morpholino group.

$$*—O—R^{26} \qquad (IIC)$$

wherein $R^{26}$ denotes a hydrocarbyl group that may contain at least one atom selected from the group consisting of a nitrogen atom, an oxygen atom, and a silicon atom, and * represents a bonding position.

Examples of the hydrocarbyl group denoted by $R^{26}$ include an alkyl group such as a methyl group, an ethyl group, an n-propyl group, an isopropyl group, an n-butyl group, a sec-butyl group, a tert-butyl group, an n-pentyl group, a neopentyl group, an isopentyl group, or an n-hexyl group; a cycloalkyl group such as a cyclohexyl group; an aryl group such as a phenyl group, a methylphenyl group, or an ethylphenyl group; and an aralkyl group such as a benzyl group. It is preferably an alkyl group.

The number of carbon atoms of the hydrocarbyl group denoted by $R^{26}$ is preferably from 1 to 10, more preferably from 1 to 6, and yet more preferably from 1 to 4.

Examples of the nitrogen atom-containing hydrocarbyl group denoted by $R^{26}$ include a dialkylaminoalkyl group such as a dimethylaminomethyl group, a dimethylaminoethyl group, a dimethylaminopropyl group, or a diethylaminoethyl group.

The number of carbon atoms of the nitrogen atom-containing hydrocarbyl group denoted by $R^{26}$ is preferably from 3 to 10, more preferably from 3 to 6, and yet more preferably from 3 to 4.

Examples of the oxygen atom-containing hydrocarbyl group denoted by $R^{26}$ include an alkoxyalkyl group such as a methoxymethyl group, a methoxyethyl group, a methoxypropyl group, an ethoxymethyl group, or an ethoxyethyl group; an oxacycloalkyl group such as an oxiranyl group or a tetrahydrofuranyl group; and an oxacycloalkylalkyl group such as a glycidyl group or a tetrahydrofurfuryl group. It is preferably an alkoxyalkyl group, an oxacycloalkyl group, or an oxacycloalkylalkyl group.

The number of carbon atoms of the oxygen atom-containing hydrocarbyl group denoted by $R^{26}$ is preferably from 2 to 10, more preferably from 2 to 6, and yet more preferably from 2 to 4.

Examples of the silicon atom-containing hydrocarbyl group denoted by $R^{26}$ include a trialkylsilylalkyl group such as a trimethylsilylmethyl group.

The number of carbon atoms of the silicon atom-containing hydrocarbyl group denoted by $R^{26}$ is preferably from 4 to 10, more preferably from 4 to 6, and yet more preferably 4.

The substituted hydrocarbyl group denoted by $R^{26}$ is preferably an alkoxyalkyl group, an oxacycloalkyl group, or an oxacycloalkylalkyl group.

Examples of the group represented by formula (IIc) include an alkoxy group such as a methoxy group, an ethoxy group, an n-propoxy group, an isopropoxy group, a sec-butoxy group, or a tert-butoxy group; a phenoxy group; a dialkylaminoalkoxy group such as a dimethylaminomethoxy group, or a diethylaminomethoxy group; and a trialkylsiloxy group such as a trimethylsiloxy group or a t-butyldimethylsiloxy group. Examples further include a 1,2-oxiranylalkoxy group such as a 1,2-oxiranylpropoxy group, a 1,2-oxiranylbutoxy group, and a 1,2-oxiranylpentyloxy group.

The group denoted by A of formula (IIa) is preferably a substituted amino group, more preferably an acyclic amino group, and yet more preferably a dialkylamino group, a di(oxacycloalkyl)amino group, a di(oxacycloalkylalkyl)amino group, or a di(trialkylsilyl)amino group.

As compound (II) for which A of formula (IIa) is a group represented by formula (IIb), the following compounds for which formula (IIb) is an acyclic amino group such as a dialkylamino group, a di(alkoxyalkyl)amino group, a di(oxacycloalkyl)amino group, or a di(oxacycloalkylalkyl)amino group can be cited.

Examples of the compound in which formula (IIb) is a dialkylamino group include
[3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, and
[3-(ethylmethylamino)propyl]triethoxysilane;
[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and
[3-(dialkylamino)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

Examples of the compound in which formula (IIb) is a di(alkoxyalkyl)amino group include
{3-[di(alkoxyalkyl)amino]propyl}trialkoxysilanes such as
{3-[di(methoxymethyl)amino]propyl}trimethoxysilane,
{3-[di(ethoxymethyl)amino]propyl}trimethoxysilane,
{3-[di(methoxyethyl)amino]propyl}trimethoxysilane,
{3-[di(ethoxyethyl)amino]propyl}trimethoxysilane,
{3-[di(methoxymethyl)amino]propyl}triethoxysilane,
{3-[di(ethoxymethyl)amino]propyl}triethoxysilane,
{3-[di(methoxyethyl)amino]propyl}triethoxysilane, and
{3-[di(ethoxyethyl)amino]propyl}triethoxysilane;
{3-[di(alkoxyalkyl)amino]propyl}alkyldialkoxysilanes such as
{3-[di(methoxymethyl)amino]propyl}methyldimethoxysilane,
{3-[di(ethoxymethyl)amino]propyl}methyldimethoxysilane,
{3-[di(methoxyethyl)amino]propyl}methyldimethoxysilane,
{3-[di(ethoxyethyl)amino]propyl}methyldimethoxysilane,
{3-[di(methoxymethyl)amino]propyl}ethyldimethoxysilane,
{3-[di(ethoxymethyl)amino]propyl}ethyldimethoxysilane,
{3-[di(methoxyethyl)amino]propyl}ethyldimethoxysilane,
{3-[di(ethoxyethyl)amino]propyl}ethyldimethoxysilane,
{3-[di(methoxymethyl)amino]propyl}methyldiethoxysilane,
{3-[di(ethoxymethyl)amino]propyl}methyldiethoxysilane,
{3-[di(methoxyethyl)amino]propyl}methyldiethoxysilane,
{3-[di(ethoxyethyl)amino]propyl}methyldiethoxysilane,
{3-[di(methoxymethyl)amino]propyl}ethyldiethoxysilane,
{3-[di(ethoxymethyl)amino]propyl}ethyldiethoxysilane,
{3-[di(methoxyethyl)amino]propyl}ethyldiethoxysilane, and
{3-[di(ethoxyethyl)amino]propyl}ethyldiethoxysilane; and
{3-[di(alkoxyalkyl)amino]propyl}dialkylalkoxysilanes such as
{3-[di(methoxymethyl)amino]propyl}dimethylmethoxysilane,
{3-[di(ethoxymethyl)amino]propyl}dimethylmethoxysilane,
{3-[di(methoxyethyl)amino]propyl}dimethylmethoxysilane,
{3-[di(ethoxyethyl)amino]propyl}dimethylmethoxysilane,
{3-[di(methoxymethyl)amino]propyl}diethylmethoxysilane,
{3-[di(ethoxymethyl)amino]propyl}diethylmethoxysilane,
{3-[di(methoxyethyl)amino]propyl}diethylmethoxysilane,
{3-[di(ethoxyethyl)amino]propyl}diethylmethoxysilane,
{3-[di(methoxymethyl)amino]propyl}di methylethoxysilane,
{3-[di(ethoxymethyl)amino]propyl}di methylethoxysilane,
{3-[di(methoxyethyl)amino]propyl}dimethylethoxysilane,
{3-[di(ethoxyethyl)amino]propyl}di methylethoxysilane,
{3-[di(methoxymethyl)amino]propyl}diethylethoxysilane,
{3-[di(ethoxymethyl)amino]propyl}diethylethoxysilane,
{3-[di(methoxyethyl)amino]propyl}diethylethoxysilane, and
{3-[di(ethoxyethyl)amino]propyl}diethylethoxysilane.

Examples of the compound in which formula (IIb) is a di(oxacycloalkyl) amino group include
compounds in which formula (IIa) is a di(oxiranyl)amino group such as
{3-[di(oxiranyl)amino]propyl}trimethoxysilane,
{3-[di(oxiranyl)amino]propyl}triethoxysilane, {3-[di(oxiranyl)amino]propyl}methyldimethoxysilane,
{3-[di(oxiranyl)amino]propyl}ethyldimethoxysilane,
{3-[di(oxiranyl)amino]propyl}methyldiethoxysilane,
{3-[di(oxiranyl)amino]propyl}ethyldiethoxysilane,
{3-[di(oxiranyl)amino]propyl}dimethylmethoxysilane,
{3-[di(oxiranyl)amino]propyl}diethylmethoxysilane,
{3-[di(oxiranyl)amino]propyl}dimethylethoxysilane, and
{3-[di(oxiranyl)amino]propyl}diethylethoxysilane; and
compounds in which formula (IIb) is a di(tetrahydrofuranyl) amino group such as
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}methyldimethoxysilane,
{3-[di(tetrahydrofuranyl)amino]propyl}ethyldimethoxysilane,
{3-[di(tetrahydrofuranyl)amino]propyl}methyldiethoxysilane,
{3-[di(tetrahydrofuranyl)amino]propyl}ethyldiethoxysilane,
{3-[di(tetrahydrofuranyl)amino]propyl}dimethylmethoxysilane,
{3-[di(tetrahydrofuranyl)amino]propyl}diethylmethoxysilane,
{3-[di(tetrahydrofuranyl)amino]propyl}dimethylethoxysilane, and
{3-[di(tetrahydrofuranyl)amino]propyl}diethylethoxysilane.

Examples of the compound in which formula (IIb) is a di(alkylene oxide alkyl)amino group include
compounds in which formula (IIb) is a di(glycidyl)amino group such as
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane; and
compounds in which formula (IIb) is a di(tetrahydrofurfuryl) amino group such as
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}methyldimethoxysilane,
{3-[di(tetrahydrofurfuryl)amino]propyl}ethyldimethoxysilane,
{3-[di(tetrahydrofurfuryl)amino]propyl}methyldiethoxysilane,
{3-[di(tetrahydrofurfuryl)amino]propyl}ethyldiethoxysilane,
{3-[di(tetrahydrofurfuryl)amino]propyl}dimethylmethoxysilane,
{3-[di(tetrahydrofurfuryl)amino]propyl}diethylmethoxysilane,
{3-[di(tetrahydrofurfuryl)amino]propyl}dimethylethoxysilane, and
{3-[di(tetrahydrofurfuryl)amino]propyl}diethylethoxysilane.

Examples of the compound in which formula (IIb) is a trialkylsilyl group include
{3-[di(trialkylsilyl)amino]propyl}trialkoxysilanes such as
{3-[di(trimethylsilyl)amino]propyl}trimethoxysilane,
{3-[di(t-butyldimethylsilyl)amino]propyl}trimethoxysilane,
{3-[di(trimethylsilyl)amino]propyl}triethoxysilane, and
{3-[di(t-butyldimethylsilyl)amino]propyl}triethoxysilane;
{3-[di(trialkylsilyl)amino]propyl}alkyldialkoxysilanes such as
{3-[di(trimethylsilyl)amino]propyl}methyldimethoxysilane,
{3-[di(t-butyldimethylsilyl)amino]propyl}methyldimethoxysilane,
{3-[di(trimethylsilyl)amino]propyl}methyldiethoxysilane, and
{3-[di(t-butyldimethylsilyl)amino]propyl}methyldiethoxysilane; and
{3-[di(trialkylsilyl)amino]propyl}dialkylalkoxysilanes such as
{3-[di(trimethylsilyl)amino]propyl}dimethylmethoxysilane,
{3-[di(t-butyldimethylsilyl)amino]propyl}dimethylmethoxysilane,
{3-[di(trimethylsilyl)amino]propyl}dimethylethoxysilane, and
{3-[di(t-butyldimethylsilyl)amino]propyl}dimethylethoxysilane.

Furthermore, examples of the compound (II) which A of formula (IIa) is a group represented by formula (IIb) include the following compounds in which formula (IIb) is an acyclic amino group such as a 1-piperidinyl group, a 1-hexamethyleneimino group, a 1-imidazolyl group, a 4,5-dihydro-1-imidazolyl group, a 1-piperazinyl group, or a morpholino group.

Examples of the compound in which formula (IIb) is a 1-piperidino group include
3-(1-piperidino)propyltrimethoxysilane,
3-(1-piperidino)propyltriethoxysilane,
3-(1-piperidino)propylmethyldimethoxysilane,
3-(1-piperidino)propylethyldimethoxysilane,
3-(1-piperidino)propylmethyldiethoxysilane, and
3-(1-piperidino)propylethyldiethoxysilane.

Examples of the compound in which formula (IIb) is a 1-hexamethyleneimino group include
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane, and
3-(1-hexamethyleneimino)propylethyldiethoxysilane.

Examples of the compound in which formula (IIb) is a 1-imidazolyl group include
N-(3-trimethoxysilylpropyl)imidazole, and
N-(3-triethoxysilylpropyl)imidazole.

Examples of compounds in which formula (IIb) is a 4,5-dihydro-1-imidazolyl group include
N-(3-trimethoxysilylpropyl)-4,5-dihydroimidazole, and
N-(3-triethoxysilylpropyl)-4,5-dihydroimidazole.

Examples of the compound in which formula (IIb) is a 1-piperazinyl group include
3-(1-piperazinyl)propyltrimethoxysilane,
3-(1-piperazinyl)propyltriethoxysilane,
3-(1-piperazinyl)propylmethyldimethoxysilane,
3-(1-piperazinyl)propylethyldimethoxysilane,
3-(1-piperazinyl)propylmethyldiethoxysilane, and
3-(1-piperazinyl)propylethyldiethoxysilane.

Examples of the compound in which formula (IIb) is a morpholino group include
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Examples of the compound (II) in which A of formula (IIa) is a group represented by formula (IIc) include the following compounds in which $R^{26}$ of formula (IIc) is an alkyl group or an oxacycloalkylalkyl group.

The following compounds in which formula (IIc) is an alkyl group:
3-(alkoxy)propyltrialkoxysilanes such as
3-(methoxy)propyltrimethoxysilane,
3-(ethoxy)propyltrimethoxysilane,
3-(n-propoxy)propyltrimethoxysilane,
3-(isopropoxy)propyltrimethoxysilane,
3-(n-butoxy)propyltrimethoxysilane,
3-(sec-butoxy)propyltrimethoxysilane, and
3-(tert-butoxy)propyltrimethoxysilane.

Compounds in which formula (IIc) is an oxacycloalkylalkyl group:
glycidoxyalkyltrialkoxysilanes such as
2-glycidoxyethyltrimethoxysilane,
3-glycidoxypropyltrimethoxysilane,
2-glycidoxyethyltriethoxysilane, and
3-glycidoxypropyltriethoxysilane.

Tetrahydrofurfuryloxyalkyltrialkoxysilanes such as
2-tetrahydrofurfuryloxyethyltrimethoxysilane,
3-tetrahydrofurfuryloxypropyltrimethoxysilane,
2-tetrahydrofurfuryloxyethyltriethoxysilane, and
3-tetrahydrofurfuryloxypropyltriethoxysilane.

Compound (II) is preferably a [3-(dialkylamino)propyl]trialkoxysilane, and more preferably
[3-(dimethylamino)propyl]trimethoxysilane,
[3-(diethylamino)propyl]trimethoxysilane,
[3-(dimethylamino)propyl]triethoxysilane, or
[3-(diethylamino)propyl]triethoxysilane.

Conjugated Diene Polymer Rubber

The conjugated diene polymer rubber comprises the above-mentioned component (A) and component (B), component (A) having a content, with the total amount of component (A) and component (B) as 100% by weight, of from 5 to 90% by weight, and component (B) having a content of from 95 to 10% by weight. In order to improve abrasion resistance, the content of component (A) is preferably not less than 10% by weight (the content of component (B) being not more than 90% by weight), more preferably not less than 15% by weight (the content of component (B) being not more than 85% by weight), and yet more preferably not less than 20% by weight (the content of component (B) being not more than 80% by weight). In order to improve fuel economy, the content of component (A) is preferably not more than 80% by weight (the content of component (B) being not less than 20% by weight), more preferably not more than 70% by weight (the content of component (B) being not less than 30% by weight), and yet more preferably not more than 50% by weight (the content of component (B) being not less than 50% by weight).

In order to increase the strength, the conjugated diene polymer preferably contains an aromatic vinyl unit in component (A) or/and (B), and the content of the aromatic vinyl unit, relative to 100% by weight of the total amount of the conjugated diene unit and the aromatic vinyl unit, is preferably at least 10% by weight (the content of the conjugated diene unit being no greater than 90% by weight), and more preferably at least 15% by weight (the content of the conjugated diene unit being no greater than 85% by weight). Furthermore, from the viewpoint of fuel economy, the content of the aromatic vinyl unit is preferably no greater than 50% by weight (the content of the conjugated diene unit being at least 50% by weight), and more preferably no greater than 45% by weight (the content of the conjugated diene unit being at least 55% by weight).

In order to improve abrasion resistance and fuel economy, the conjugated diene polymer rubber component preferably contains a constituent unit based on a silicon-containing monomer in component (A) and/or component (B), more preferably contains a constituent unit based on a silicon-containing monomer in component (A), yet more preferably contains a constituent unit based on a silicon-containing monomer in component (A) and component (B). The silicon-containing monomer is preferably a monomer represented by formula (X).

In order to improve abrasion resistance and fuel economy, the content of the constituent unit based on a silicon-containing monomer in the conjugated diene polymer rubber is preferably not less than 0.001 mmol/g and not more than 0.1 mmol/g per unit weight of component (B). It is more preferably not less than 0.002 mmol/g and not more than 0.07 mmol/g. It is yet more preferably not less than 0.003 mmol/g and not more than 0.05 mmol/g.

In order to improve fuel economy, the vinyl bond content (proportion of conjugated diene-based 1,2-addition constitutional unit) of the conjugated diene polymer of the present invention, with the content of the conjugated diene unit as 100% by mol, is preferably no greater than 80% by mol, and more preferably no greater than 70% by mol. Furthermore, from the viewpoint of grip properties, it is preferably at least 10% by mol, more preferably at least 15% by mol, yet more preferably at least 20% by mol, and particularly preferably at least 40% by mol. The vinyl bond content may be obtained by IR spectroscopy from the absorption intensity at around 910 $cm^{-1}$, which is an absorption peak of a vinyl group.

In order to increase strength, the Mooney viscosity ($ML_{1+4}$) of the conjugated diene polymer of the present invention is preferably not less than 10, and more preferably not less than 20. Furthermore, in order to improve processability, it is preferably not more than 200, and more preferably not more than 150. The Mooney viscosity ($ML_{1+4}$) is measured at 100° C. in accordance with JIS K6300 (1994).

In order to improve fuel economy, the molecular weight distribution of the conjugated diene polymer rubber is preferably 1 to 5, and more preferably 1 to 2. The molecular weight distribution is obtained by measuring number-average molecular weight (Mn) and weight-average molecular weight (Mw) by a gel permeation chromatograph (GPC) method, and dividing Mw by Mn.

Method for Producing Conjugated Diene Polymer Rubber

As a preferred method for producing the conjugated diene polymer rubber of the present invention, a method in which component (A) and component (B) are separately prepared, and component (A) and component (B) are mixed by a known method (a method in which melt mixing is carried out by means of a known kneader such as a roll or a Banbury, a method in which solution mixing is carried out in a hydrocarbon solvent, etc.) can be cited. Furthermore, a production method including step (c-1), step (c-2), and step (c-3) below can also be cited.

Step (c-1): a step of polymerizing a monomer component including a conjugated diene in a hydrocarbon solvent by an alkali metal catalyst, thus giving a polymer having an alkali metal derived from the catalyst in at least one conjugated diene-based monomer unit-containing polymer chain terminus.

Step (c-2): a step of reacting the alkali metal-containing polymer terminus of the polymer obtained in step (c-1) with a carbonyl group- and substituted amino group-containing compound (compound (I)), the amount of compound (I) used being not less than 0.05 mol and not more than 0.9 mol per mole of the alkali metal of the alkali metal catalyst used in step (c-1).

Step (c-3): a step of reacting the alkali metal-containing polymer terminus of the polymer having an alkali metal in at least one polymer terminus with a compound represented by formula (IIa) below (compound (II)) after step (c-2) is completed, the amount of compound (II) used satisfying expression (i) below.

$$X(II) \times y \geq X(I) \times (10/90) \quad (i)$$

X (I): amount of compound (I) used in step (c-2) (units: mol)

X (II): amount of compound (II) used in step (c-3) (units: mol)

y: value for m in formula (IIa)

$$(R^{21}O)_m Si(R^{22}A)_n R^{23}{}_{4-m-n} \quad (IIa)$$

wherein m denotes a number from 1 to 3, n denotes a number from 1 to 3, m+n is from 2 to 4, $R^{21}$ and $R^{23}$ denote a hydrocarbyl group, $R^{22}$ denotes a hydrocarbylene group, A denotes a substituted amino group or an optionally substituted hydrocarbyloxy group, when there are a plurality of $R^{21}$s the plurality of $R^{21}$s may be identical to or different from each other, when there are a plurality of $R^{22}$s the plurality of $R^{22}$s may be identical to or different from each other, when there are a plurality of $R^{23}$s the plurality of $R^{23}$s may be identical to or different from each other, and when there are a plurality of As the plurality of As may be identical to or different from each other.

Examples of the alkali metal catalyst that may be used in (c-1) include an alkali metal, an organoalkali metal compound, a complex between an alkali metal and a polar compound, an oligomer having an alkali metal, etc.

Examples of the alkali metal include lithium, sodium, potassium, rubidium, and cesium.

Examples of the organoalkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide.

Examples of the complex between an alkali metal and a polar compound include a potassium-tetrahydrofuran complex and a potassium-diethoxyethane complex.

Examples of the oligomer having an alkali metal include the sodium salt of a-methylstyrene tetramer.

Among them, an organolithium compound or an organosodium compound is preferable, and an organolithium compound or organosodium compound having 2 to 20 carbon atoms is more preferable.

The hydrocarbon solvent used in step (c-1) is a solvent that does not deactivate the organoalkali metal compound catalyst, and examples thereof include an aliphatic hydrocarbon, an aromatic hydrocarbon, and an alicyclic hydrocarbon. Specific examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. Specific examples of the aromatic hydrocarbon include benzene, toluene, xylene, and ethylbenzene, and specific examples of the alicyclic hydrocarbon include cyclopentane and cyclohexane. They may be used on their own or in a combination of two or more types. Among them, a hydrocarbon having 2 to 12 carbon atoms is preferable.

In step (c-1), monomer containing a conjugated diene are polymerized to produce a conjugated diene polymer having at a polymer chain terminus an alkali metal originating from the above-mentioned alkali metal catalyst. Examples of the conjugated diene include 1,3-butadiene, isoprene, 1,3-pentadiene, 2,3-dimethyl-1,3-butadiene, and 1,3-hexadiene, and they may be used on their own or in a combination of two or more types. Among them, from the viewpoint of ready availability, 1,3-butadiene and isoprene are preferable.

In step (c-1), polymerization may be carried out using the conjugated diene and another monomer. Examples of said other monomer include an aromatic vinyl, a vinylnitrile, and an unsaturated carboxylic acid ester. Specific examples of the aromatic vinyl include styrene, □-methylstyrene, vinyltoluene, vinylnaphthalene, divinylbenzene, trivinylbenzene, and divinylnaphthalene. Specific examples of the vinylnitrile include acrylonitrile, and specific examples of the unsaturated carboxylic acid ester include methyl acrylate, ethyl acrylate, methyl methacrylate, and ethyl methacrylate. Among them, an aromatic vinyl is preferable, and styrene is more preferable.

The amount of aromatic vinyl used, with the total amount of conjugated diene and aromatic vinyl used as 100% by weight, is not less than 0% by weight (the amount of conjugated diene used being not more than 100% by weight); in order to improve strength it is preferably not less than 10% by weight (the amount of conjugated diene used being not more than 90% by weight), and more preferably not less than 15% by weight (the amount of conjugated diene used being not more than 85% by weight). In order to improve fuel economy, the amount of aromatic vinyl used is preferably not more than 50% by weight (the amount of conjugated diene used being not less than 50% by weight), and more preferably not more than 45% by weight (the amount of conjugated diene used being not less than 55% by weight).

In step (c-1), in order to improve abrasion resistance and fuel economy of the conjugated diene polymer rubber obtained, it is preferable to use a silicon-containing monomer as one of the monomer components and carry out polymerization of the monomer components including the conjugated diene and the silicon-containing monomer in the hydrocarbon solvent by means of the alkali metal catalyst, thus giving a polymer having a catalyst-derived alkali metal on at least one terminus of a polymer chain containing a conjugated diene-based monomer unit and a constituent unit based on a silicon-containing monomer. The silicon-containing monomer is preferably a monomer represented by formula (X) above.

In order to improve abrasion resistance and fuel economy, the amount of silicon-containing monomer used, per g of monomer components used for polymerization, is preferably not less than 0.001 m mmol, more preferably not less than 0.002 mmol, and yet more preferably not less than 0.003 mmol. The amount used is preferably not more than 0.1 mmol, more preferably not more than 0.07 mmol, and yet more preferably not more than 0.05 mmol.

The polymerization in step (c-1) may be carried out in the presence of an agent for regulating the vinyl bond content of the conjugated diene unit, an agent for regulating the distribution in the conjugated diene polymer chain of the conjugated diene unit and a constituent unit based on a monomer other than the conjugated diene (hereafter, generally called 'regulators'), etc. Examples of such agents include an ether compound, a tertiary amine, and a phosphine compound. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Specific examples of the tertiary amine include triethylamine, tripropylamine, tributylamine, N,N,N',N'-tetramethylethylenediamine, N,N-diethylaniline, pyridine, and quinoline. Specific examples of the phosphine compound include trimethylphosphine, triethylphosphine, and triphenylphosphine. They may be used on their own or in a combination of two or more types.

The polymerization temperature in step A is preferably from 25° C. to 100° C., more preferably from 35° C. to 90° C., and yet more preferably from 50° C. to 80° C. The polymerization time is preferably from 10 minutes to 5 hours.

In step (c-2), the amount of compound (I) used in the reaction between the polymer prepared in step (c-1) and compound (I) is preferably from 0.05 to 0.9 mol per mol of the alkali metal of alkali metal catalyst used in step (c-1). In order to improve abrasion resistance, the amount of the compound (I) is more preferably more than 0.1 mol, yet more preferably more than 0.15 mol, particularly preferably more than 0.2 mol. In order to improve fuel economy, the amount of the compound (I) is more preferably less than 0.8 mol, and yet more preferably less than 0.7 mol, particularly preferably less than 0.5 mol.

In step (c-2), the temperature at which the polymer prepared in step (c-2) and the compound (I) are reacted is preferably from 25° C. to 100° C., more preferably from 35° C. to 90° C., and yet more preferably from 50° C. to 80° C. The contact time is preferably 60 sec to 5 hours, and more preferably from 15 min to 1 hour.

In step (c-3), the amount of compound (II) used in the reaction between the polymer having an alkali metal in at least one polymer terminus and compound (II) is preferably an amount that satisfies relationship (i) below. In order to improve abrasion resistance, it is more preferably an amount that satisfies relationship (ii) below, yet more preferably an amount that satisfies relationship (iii) below, and particularly preferably an amount that satisfies relationship (iv) below. In order to improve fuel economy, it is more preferably an amount that satisfies relationship (v) below, yet more preferably an amount that satisfies relationship (vi) below, yet more preferably an amount that satisfies relationship (vii) below, and particularly preferably an amount that satisfies relationship (viii) below.

$$X(II) \times y \geq X(I) \times (10/90) \tag{i}$$

$$X(II) \times y \geq X(I) \times (20/80) \tag{ii}$$

$$X(II) \times y \geq X(I) \times (30/70) \tag{iii}$$

$$X(II) \times y \geq X(I) \times (50/50) \tag{iv}$$

$$X(I) \times (95/5) \geq X(II) \tag{v}$$

$$X(I) \times (90/10) \geq X(II) \tag{vi}$$

$$X(I) \times (85/15) \geq X(II) \tag{vii}$$

$$X(I) \times (80/20) \geq X(II) \tag{viii}$$

X (I): amount of compound (I) used in step (c-2) (units: mol)

X (II): amount of compound (II) used in step (c-3) (units: mol)

y: value for m in formula (IIa)

In step (c-3), the temperature at which the polymer having an alkali metal in at least one polymer terminus and compound (II) are reacted is preferably from 25° C. to 100° C., and more preferably from 35° C. to 90° C. It is yet more preferably from 50° C. to 80° C. The reaction time is preferably from 60 seconds to 5 hours, more preferably from 5 minutes to 1 hour, and yet more preferably from 15 minutes to 1 hour.

In the production method of the conjugated diene polymer rubber, a coupling agent may be added to the hydrocarbon solution of the conjugated diene polymer as necessary from initiation of polymerization of monomer by an alkali metal catalyst to termination of polymerization. Examples of the coupling agent include a compound represented by formula (III) below,

$$R^{31}{}_a ML_{4-a} \tag{III}$$

wherein $R^{10}$ denotes an alkyl group, an alkenyl group, a cycloalkenyl group, or an aromatic residue, M denotes a silicon atom or a tin atom, L denotes a halogen atom or a hydrocarbyloxy group, and a denotes an integer of 0 to 2.

Here, the aromatic residue denotes a monovalent group in which a hydrogen bonded to an aromatic ring is removed from an aromatic hydrocarbon.

Examples of the coupling agent of formula (III) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, di methoxydi methylsilane, methyltriethoxysilane, ethyltrimethoxysilane, dimethoxydiethylsilane, diethoxydi methylsilane, tetraethoxysilane, ethyltriethoxysilane, and diethoxydiethylsilane.

From the viewpoint of processability of the conjugated diene polymer, the amount of coupling agent added is preferably not less than 0.03 mol per mol of the alkali metal originating from the alkali metal catalyst, and more preferably not less than 0.05 mol. Furthermore, from the viewpoint of fuel economy, it is preferably not more than 0.4 mol, and more preferably not more than 0.3 mol.

The conjugated diene polymer rubber may be recovered from the hydrocarbon solution of the conjugated diene polymer rubber by a known recovery method such as, for example, (1) a method in which a coagulant is added to the hydrocarbon solution of the conjugated diene polymer or (2) a method in which steam is added to the hydrocarbon solution of the conjugated diene polymer. The conjugated diene polymer thus recovered may be dried by a known dryer such as a band dryer or an extrusion dryer.

A Conjugated Diene Polymer Rubber Composition

The conjugated diene polymer rubber of the present invention may be used in a conjugated diene polymer rubber composition by combining another polymer component, an additive, etc. therewith.

Examples of another polymer component include conventional styrene-butadiene copolymer rubber, polybutadiene rubber, butadiene-isoprene copolymer rubber, and butyl rubber. Examples further include natural rubber, an ethylene-propylene copolymer, and an ethylene-octene copolymer. These polymer components may be used in a combination of two or more types.

In the case where another polymer component is combined with the conjugated diene polymer rubber of the present invention, from the viewpoint of fuel economy, the amount of conjugated diene polymer of the present invention is preferably not less than 10 parts by weight, and more preferably not less than 20 parts by weight per 100 parts by weight of the total amount of polymer components combined (including the amount of conjugated diene polymer combined).

As the additive, a known additive may be used, and examples thereof include a vulcanizing agent such as sulfur; a vulcanization accelerator such as a thiazole-based vulcanization accelerator, a thiuram-based vulcanization accelerator, a sulfenamide-based vulcanization accelerator, or a guanidine-based vulcanization accelerator; a vulcanization activator such as stearic acid or zinc oxide; an organic peroxide; a filler such as silica, carbon black, calcium carbonate, talc, alumina, clay, aluminum hydroxide, or mica; a silane coupling agent; an extender oil; a processing aid; an antioxidant; and a lubricant.

Examples of the silica include dry silica (anhydrous silicic acid), wet silica (hydrated silicic acid), colloidal silica, precipitated silica, calcium silicate, and aluminum silicate. One type thereof may be used on its own, or two or more types thereof may be used in combination. The BET specific surface area of the silica is preferably from 50 to 250 $m^2/g$. The BET specific surface area is measured in accordance with ASTM D1993-03. As a commercial product, product names VN3, AQ, ER, and RS-150 manufactured by Tosoh Silica Corporation, product names Zeosil 1115 MP and 1165 MP manufactured by Rhodia, etc. may be used.

Examples of the carbon black include furnace black, acetylene black, thermal black, channel black, and graphite. With regard to the carbon black, channel carbon black such as EPC, MPC, or CC; furnace carbon black such as SAF, ISAF, HAF, MAF, FEF, SRF, GPF, APF, FF, CF, SCF, or ECF; thermal carbon black such as FT or MT; and acetylene carbon black can be cited as examples. One type thereof may be used or two or more types thereof may be used in combination.

The nitrogen adsorption specific surface area ($N_2SA$) of the carbon black is preferably from 5 to 200 $m^2/g$, and the dibutyl phthalate (DBP) absorption of the carbon black is preferably from 5 to 300 mL/100 g. The nitrogen adsorption specific surface area is measured in accordance with ASTM D4820-93, and the DBP absorption is measured in accordance with ASTM D2414-93. As a commercial product, product names SEAST 6, SEAST 7HM, and SEAST KH manufactured by Tokai Carbon Co., Ltd., product names CK 3 and Special Black 4A manufactured by Degussa, Inc., etc. may be used.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One type thereof may be used or two or more types thereof may be used in combination. As a commercial product, product names Si69 and Si75 manufactured by Degussa, Inc., etc. may be used.

When a conjugated diene polymer rubber is formed by combining a filler with the conjugated diene polymer rubber of the present invention, the amount of filler combined, relative to 100 parts by weight of the conjugated diene polymer of the present invention combined, is preferably from 10 to 150 parts by weight. From the viewpoint of abrasion resistance and strength, the amount combined is more preferably not less than 20 parts by weight, and yet more preferably not less than 30 parts by weight. From the viewpoint of reinforcement being enhanced, it is more preferably not more than 120 parts by weight, and yet more preferably not more than 100 parts by weight.

When a conjugated diene polymer rubber is formed by combining a filler from the viewpoint of fuel economy, it is preferable to use silica as a filler. The amount of silica combined is preferably not less than 50 parts by weight relative to 100 parts by weight of the total amount of fillers combined, and more preferably not less than 70 parts by weight.

Examples of the extender oil include an aromatic mineral oil (viscosity-gravity constant (V.G.C. value) from 0.900 to 1.049), a naphthenic mineral oil (V.G.C. value from 0.850 to 0.899), and a paraffinic mineral oil (V.G.C. value from 0.790 to 0.849). The polycyclic aromatic content of the extender oil is preferably less than 3% by weight, and more preferably less than 1% by weight. The polycyclic aromatic content is measured in accordance with British Institute of Petroleum method 346/92. Furthermore, the aromatic compound content (CA) of the extender oil is preferably not less than 20% by weight. Two or more types of extender oils may be used in combination.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine and orthotolylbiguanidine. The amount thereof used is preferably 0.1 to 5 parts by weight relative to 100 parts by weight of rubber component, and more preferably 0.2 to 3 parts by weight.

As a method for producing a conjugated diene polymer rubber by combining another polymer component, an additive, etc. with the conjugated diene polymer of the present invention, a known method such as, for example, a method in which the components are kneaded by means of a known mixer such as a roll or Banbury mixer can be used.

With regard to kneading conditions, when an additive other than a vulcanizing agent or a vulcanization accelerator is combined, the kneading temperature is preferably from 50° C. to 200° C. and more preferably from 80° C. to 190° C., and the kneading time is preferably from 30 sec to 30 min and more preferably from 1 min to 30 min. When a vulcanizing agent or a vulcanization accelerator is combined, the kneading temperature is preferably not more than 100° C., and more preferably from room temperature to 80° C. A composition in which a vulcanizing agent or a vulcanization accelerator is combined is preferably used after carrying out a vulcanization treatment such as press vulcanization. The vulcanization temperature is preferably from 120° C. to 200° C., and more preferably from 140° C. to 180° C.

The conjugated diene polymer rubber composition of the present invention have excellent fuel economy. The grip properties are also good.

The conjugated diene polymer rubber and the conjugated diene polymer rubber composition of the present invention are used for tires, shoe soles, flooring materials, vibration-proofing materials, etc., and are particularly suitably used for tires.

In accordance with the present invention, there can be provided a conjugated diene polymer rubber that can give a conjugated diene polymer rubber composition having excellent abrasion resistance and a conjugated diene polymer rubber composition containing the conjugated diene polymer rubber and a filler.

EXAMPLES

The present invention is explained below by reference to Examples.

'Normal temperature' in the Examples means 25° C.

Physical properties were evaluated by the following methods.

1. Mooney Viscosity ($ML_{1+4}$)

The Mooney viscosity of a polymer was measured at 100° C. in accordance with JIS K6300 (1994).

2. Vinyl Bond Content (Units: % by Mol)

The vinyl bond content of a polymer was determined by IR spectroscopy from the absorption intensity at around 910 $cm^{-1}$, which is an absorption peak of a vinyl group.

3. Styrene Unit Content (Units: % by Weight)

The styrene unit content of a polymer was determined from refractive index in accordance with JIS K6383 (1995).

4. Molecular Weight Distribution (Mw/Mn)

Weight-average molecular weight (Mw) and number-average molecular weight (Mn) were measured under conditions (1) to (8) below by a gel permeation chromatograph (GPC) method, and the molecular weight distribution (Mw/Mn) of a polymer was determined.
(1) Instrument: HLC-8020 manufactured by Tosoh Corporation
(2) Separation column: GMH-XL (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 μL
(7) Detector: differential refractometer
(8) Molecular weight standard: standard polystyrene 5. Abrasion Resistance (Units: Mg/1,000 Rotations)

A ring-shaped vulcanized molded body is used as a test piece; the amounts abraded under conditions of a load of 10 pounds and a test piece rotational speed of 300 rpm for from 500 to 1,500 rotations, from 1,500 to 2,500 rotations, and from 2,500 to 3,500 rotations are measured using an Akron abrasion tester (Ueshima Seisakusho Co., Ltd.), and the average value thereof is calculated. The smaller this value, the better the abrasion resistance.

6. Fuel Economy

A strip-shaped test piece having a width of 1 or 2 mm and a length of 40 mm was stamped out from a sheet-shaped vulcanized molding and used for testing. The loss tangent (tan δ (70° C.)) at 70° C. of the test piece was measured using a viscoelastometer (Ueshima Seisakusho Co., Ltd.) under conditions of a strain of 1% and a frequency of 10 Hz. The smaller this value, the better the fuel economy.

Example 1

Preparation of Component (A)

A 20 L capacity stainless polymerization reactor was washed, dried, flushed with dry nitrogen, and charged with 10.2 kg of industrial hexane (density 680 $kg/m^3$), 604 g of 1,3-butadiene, 196 g of styrene, 6.1 mL of tetrahydrofuran, and 4.36 mL of ethylene glycol diethyl ether. Subsequently, 14.65 mmol of n-butyllithium was charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g.

Following this, the polymerization reaction solution thus obtained was stirred at a stirring speed of 130 rpm, 11.40 mmol of N-(3-dimethylaminopropyl)acrylamide was added thereto, and stirring was carried out for 15 minutes.

20 mL of a hexane solution containing 0.70 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (A1)) in which component (A) was dissolved.

Preparation of Component (B)

A 20 L capacity stainless polymerization reactor was washed, dried, flushed with dry nitrogen, and charged with 10.2 kg of industrial hexane (density 680 $kg/m^3$), 604 g of 1,3-butadiene, 196 g of styrene, 6.1 mL of tetrahydrofuran, and 4.36 mL of ethylene glycol diethyl ether. Subsequently, 14.99 mmol of n-butyllithium was charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g.

Following this, the polymerization reaction solution thus obtained was stirred at a stirring speed of 130 rpm, 11.40 mmol of 3-diethylaminopropyltriethoxysilane was added thereto, and stirring was carried out for 15 minutes.

20 mL of a hexane solution containing 0.70 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (B1)) in which component (B) was dissolved.

Preparation of Polymer Rubber 50 parts by weight of solution (A1) and 50 parts by weight of solution (B1) were mixed, and the mixed solution thus obtained was evaporated at normal temperature for 24 hours and further dried under reduced pressure at 55° C. for 12 hours, thus giving a polymer rubber. The results of evaluation of the polymer rubber are given in Table 1. 'Normal temperature' in the Examples means 25° C.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 1.

Example 2

The procedure of Example 1 was repeated except that a mixed solution was prepared with the amount of solution (A1) as 60 parts by weight and the amount of solution (B1) as 40 parts by weight. The results of evaluation of the polymer rubber and the vulcanized sheet are given in Table 1.

Example 3

The procedure of Example 1 was repeated except that a mixed solution was prepared with the amount of solution (A1) as 70 parts by weight and the amount of solution (B1) as 30 parts by weight. The results of evaluation of the polymer rubber and the vulcanized sheet are given in Table 1.

TABLE 1

|  |  | Example 1 | Example 2 | Example 3 |
|---|---|---|---|---|
| Mooney viscosity | — | 54 | 55 | 56 |
| Vinyl bond content | % by mol | 58 | 58 | 58 |
| Styrene unit content | % by weight | 25 | 25 | 25 |
| Molecular weight distribution | — | 1.23 | 1.22 | 1.18 |
| Abrasion resistance Loss | mg/ 1,000 rotations | 290 | 280 | 290 |
| Fuel economy tan δ (70° C.) | — | 0.158 | 0.165 | 0.187 |

Example 4

Preparation of Polymer Rubber

A 30 L capacity stainless polymerization reactor was washed, dried, flushed with dry nitrogen, and charged with 15.3 kg of industrial hexane (density 680 kg/m$^3$), 912 g of 1,3-butadiene, 288 g of styrene, 9.1 mL of tetrahydrofuran, and 6.36 mL of ethylene glycol diethyl ether. Subsequently, 21.25 mmol of n-butyllithium was charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 1,368 g, and the amount of styrene supplied was 432 g.

Following this, the polymerization reaction solution thus obtained was stirred at a stirring speed of 130 rpm, 4.63 mmol (0.22 mol per mol of n-butyllithium) of N-(3-dimethylaminopropyl)acrylamide was added thereto, and stirring was carried out for 15 minutes.

Following this, the polymerization reaction solution thus obtained was stirred at a stirring speed of 130 rpm, 13.88 mmol of 3-diethylaminopropyltriethoxysilane was added thereto, and stirring was carried out for 15 minutes.

20 mL of a hexane solution containing 1.12 mL of methanol was added to the polymerization reaction solution, and the polymerization reaction solution was stirred for a further 5 minutes.

To the polymerization reaction solution were added 12.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 6.0 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 2.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 2.

Comparative Example 1

Preparation of Polymer Rubber

A 20 L capacity stainless polymerization reactor was washed, dried, flushed with dry nitrogen, and charged with 10.2 kg of industrial hexane (density 680 kg/m$^3$), 547 g of 1,3-butadiene, 173 g of styrene, 6.07 mL of tetrahydrofuran, and 4.12 mL of ethylene glycol diethyl ether. Subsequently, 13.31 mmol of n-butyllithium was charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied throughout the polymerization was 821 g, and the amount of styrene supplied was 259 g.

Following this, the polymerization reaction solution thus obtained was stirred at a stirring speed of 130 rpm, 11.25 mmol of N-(3-dimethylaminopropyl)acrylamide was added thereto, and stirring was carried out for 15 minutes.

20 mL of a hexane solution containing 1.12 mL of methanol was added to the polymerization reaction solution, and the polymerization reaction solution was stirred for a further 5 minutes.

To the polymerization reaction solution were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 2.

(Preparation of Rubber Composition and Vulcanized Sheet)

100 parts by weight of the polymer thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 2.

Comparative Example 2

Preparation of Polymer Rubber

A 5 L capacity stainless polymerization reactor was washed, dried, flushed with dry nitrogen, and charged with 2.55 kg of industrial hexane (density 680 kg/m$^3$), 137 g of 1,3-butadiene, 43 g of styrene, 1.52 mL of tetrahydrofuran, and 1.06 mL of ethylene glycol diethyl ether. Subsequently, 3.56 mmol of n-butyllithium was charged as an n-hexane solution, and polymerization was started.

Copolymerization of 1,3-butadiene and styrene was carried out at a stirring speed of 130 rpm and a polymerization reactor internal temperature of 65° C. for 2.5 hours while continuously supplying the monomers to the polymerization reactor. The amount of 1,3-butadiene supplied throughout the polymerization was 205 g, and the amount of styrene supplied was 65 g.

Following this, the polymerization reaction solution thus obtained was stirred at a stirring speed of 130 rpm, 2.81 mmol of 3-diethylaminopropyltriethoxysilane was added thereto, and stirring was carried out for 15 minutes.

20 mL of a hexane solution containing 0.17 mL of methanol was added to the polymerization reaction solution, and the polymerization reaction solution was stirred for a further 5 minutes.

To the polymerization reaction solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 0.9 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 2.

(Preparation of Rubber Composition and Vulcanized Sheet)

100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 2.

TABLE 2

|  |  | Example 4 | Comparative Example 1 | Comparative Example 2 |
|---|---|---|---|---|
| Mooney viscosity | — | 45 | 41 | 66 |
| Vinyl bond content | % by mol | 57 | 57 | 55 |
| Styrene unit content | % by weight | 24 | 24 | 24 |
| Molecular weight distribution | — | 1.15 | 1.09 | 1.23 |

TABLE 2-continued

|  |  | Example 4 | Comparative Example 1 | Comparative Example 2 |
|---|---|---|---|---|
| Abrasion resistance Loss | mg/ 1,000 rotations | 310 | 340 | 360 |
| Fuel economy tan δ (70° C.) | — | 0.165 | 0.210 | 0.141 |

Example 5

Preparation of Component (A)

A 20 L capacity stainless polymerization reactor was washed, dried, flushed with dry nitrogen, and charged with 10.2 kg of industrial hexane (density 680 kg/m$^3$), 604 g of 1,3-butadiene, 196 g of styrene, 6.1 mL of tetrahydrofuran, and 4.36 mL of ethylene glycol diethyl ether. Subsequently, 8.54 mmol of bis(diethylamino)methylvinylsilane and 14.49 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g. Furthermore, the amount of bis(diethylamino)methylvinylsilane charged per monomer unit weight charged and supplied to the polymerization reactor was 0.0043 mmol.

Following this, the polymerization reaction solution thus obtained was stirred at a stirring speed of 130 rpm, 12.20 mmol of N-(3-dimethylaminopropyl)acrylamide was added thereto, and stirring was carried out for 15 minutes.

20 mL of a hexane solution containing 0.74 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (A2)) in which component (A) was dissolved.

Preparation of Component (B)

A 20 L capacity stainless polymerization reactor was washed, dried, flushed with dry nitrogen, and charged with 10.2 kg of industrial hexane (density 680 kg/m$^3$), 604 g of 1,3-butadiene, 196 g of styrene, 6.1 mL of tetrahydrofuran, and 4.36 mL of ethylene glycol diethyl ether. Subsequently, 8.54 mmol of bis(diethylamino)methylvinylsilane and 14.31 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g. Furthermore, the amount of bis(diethylamino)methylvinylsilane charged per monomer unit weight charged and supplied to the polymerization reactor was 0.0043 mmol.

Following this, the polymerization reaction solution thus obtained was stirred at a stirring speed of 130 rpm, 12.20 mmol of 3-diethylaminopropyltriethoxysilane was added thereto, and stirring was carried out for 15 minutes.

20 mL of a hexane solution containing 0.74 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (B2)) in which component (B) was dissolved.

Preparation of Polymer Rubber 10 parts by weight of solution (A2) and 90 parts by weight of solution (B2) were mixed, and the mixed solution thus obtained was evaporated at normal temperature for 24 hours and further dried under reduced pressure at 55° C. for 12 hours, thus giving a polymer rubber. The results of evaluation of the polymer rubber are given in Table 3.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 3.

Example 6

The procedure of Example 5 was repeated except that a mixed solution was prepared with the amount of solution (A2) as 25 parts by weight and the amount of solution (B2) as 75 parts by weight. The results of evaluation of the polymer rubber and the vulcanized sheet are given in Table 3.

Example 7

The procedure of Example 5 was repeated except that a mixed solution was prepared with the amount of solution (A2) as 50 parts by weight and the amount of solution (B2) as 50 parts by weight. The results of evaluation of the polymer rubber and the vulcanized sheet are given in Table 3.

Example 8

The procedure of Example 5 was repeated except that a mixed solution was prepared with the amount of solution (A2) as 70 parts by weight and the amount of solution (B2) as 30 parts by weight. The results of evaluation of the polymer rubber and the vulcanized sheet are given in Table 3.

TABLE 3

|  |  | Example 5 | Example 6 | Example 7 | Example 8 |
|---|---|---|---|---|---|
| Mooney viscosity | — | 41 | 37 | 38 | 31 |
| Vinyl bond content | % by mol | 56 | 56 | 56 | 56 |
| Styrene unit content | % by weight | 25 | 25 | 25 | 25 |
| Molecular weight distribution | — | 1.21 | 1.19 | 1.17 | 1.15 |
| Abrasion resistance Loss | mg/ 1,000 rotations | 230 | 210 | 210 | 220 |
| Fuel economy tan δ (70° C.) | — | 0.127 | 0.123 | 0.126 | 0.13 |

Example 9

Preparation of Component (A)

A 20 L capacity stainless polymerization reactor was washed, dried, flushed with dry nitrogen, and charged with 10.2 kg of industrial hexane (density 680 kg/m$^3$), 604 g of 1,3-butadiene, 196 g of styrene, 6.1 mL of tetrahydrofuran, and 4.36 mL of ethylene glycol diethyl ether. Subsequently, 12.2 mmol of bis(diethylamino)methylvinylsilane and 15.72 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g. Furthermore, the amount of bis(diethylamino)methylvinylsilane charged per monomer unit weight charged and supplied to the polymerization reactor was 0.0061 mmol.

Following this, the polymerization reaction solution thus obtained was stirred at a stirring speed of 130 rpm, 12.20 mmol of N-(3-dimethylaminopropyl)acrylamide was added thereto, and stirring was carried out for 15 minutes.

20 mL of a hexane solution containing 0.74 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (A3)) in which component (A) was dissolved.

Preparation of Component (B)

A 20 L capacity stainless polymerization reactor was washed, dried, flushed with dry nitrogen, and charged with 10.2 kg of industrial hexane (density 680 kg/m$^3$), 604 g of 1,3-butadiene, 196 g of styrene, 6.1 mL of tetrahydrofuran, and 4.36 mL of ethylene glycol diethyl ether. Subsequently, 12.2 mmol of bis(diethylamino)methylvinylsilane and 14.84 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 3 hours while continuously supplying the monomers to the polymerization reactor. The amount of 1,3-butadiene supplied was 906 g, and the amount of styrene supplied was 294 g. Furthermore, the amount of bis(diethylamino)methylvinylsilane charged per monomer unit weight charged and supplied to the polymerization reactor was 0.0061 mmol.

Following this, the polymerization reaction solution thus obtained was stirred at a stirring speed of 130 rpm, 12.20 mmol of 3-diethylaminopropyltriethoxysilane was added thereto, and stirring was carried out for 15 minutes.

20 mL of a hexane solution containing 0.74 mL of methanol was added to the polymerization reaction solution, and the polymerization reaction solution was stirred for a further 5 minutes.

Following this, to the polymerization reaction solution thus obtained were added 8.0 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 4.0 g of pentaerythritol tetrakis(3-laurylthiopropionate) (product name: Sumilizer TP-D, manufactured by Sumitomo Chemical Co., Ltd.), thus giving a polymer solution (hereinafter, called solution (B3)) in which component (B) was dissolved.

Preparation of Polymer Rubber 20 parts by weight of solution (A3) and 80 parts by weight of solution (B3) were mixed, and the mixed solution thus obtained was evaporated at normal temperature for 24 hours and further dried under reduced pressure at 55° C. for 12 hours, thus giving a polymer rubber. The results of evaluation of the polymer rubber are given in Table 4.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 4.

Example 10

The procedure of Example 9 was repeated except that a mixed solution was prepared with the amount of solution (A3) as 50 parts by weight and the amount of solution (B3) as 50 parts by weight. The results of evaluation of the polymer rubber and the vulcanized sheet are given in Table 4.

Example 11

The procedure of Example 9 was repeated except that a mixed solution was prepared with the amount of solution (A3) as 75 parts by weight and the amount of solution (B3) as 25 parts by weight. The results of evaluation of the polymer rubber and the vulcanized sheet are given in Table 4.

TABLE 4

|  |  | Example 9 | Example 10 | Example 11 |
|---|---|---|---|---|
| Mooney viscosity | — | 53 | 48 | 44 |
| Vinyl bond content | % by mol | 57 | 57 | 57 |
| Styrene unit content | % by weight | 24 | 24 | 25 |
| Molecular weight distribution | — | 1.21 | 1.18 | 1.15 |
| Abrasion resistance Loss | mg/ 1,000 rotations | 250 | 240 | 240 |
| Fuel economy tan δ (70° C.) | — | 0.109 | 0.104 | 0.103 |

Example 12

Preparation of Polymer Rubber

A 5 L capacity stainless polymerization reactor was washed, dried, flushed with dry nitrogen, and charged with 2.55 kg of industrial hexane (density 680 kg/m$^3$), 137 g of 1,3-butadiene, 43 g of styrene, 1.52 mL of tetrahydrofuran, and 1.09 mL of ethylene glycol diethyl ether. Subsequently, 1.97 mmol of bis(diethylamino)methylvinylsilane and 3.56 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 2.5 hours while continuously supplying the monomers to the polymerization reactor. The amount of 1,3-butadiene supplied was 205 g, and the amount of styrene supplied was 65 g. Furthermore, the amount of bis(diethylamino)methylvinylsilane charged per monomer unit weight charged and supplied to the polymerization reactor was 0.0044 mmol.

Following this, the polymerization reaction solution thus obtained was stirred at a stirring speed of 130 rpm, 0.42 mmol (0.12 mol per mol of n-butyllithium) of N-(3-dimethylaminopropyl)acrylamide was added thereto, and stirring was carried out for 15 minutes.

Following this, the polymerization reaction solution thus obtained was stirred at a stirring speed of 130 rpm, 2.39 mmol of 3-diethylaminopropyltriethoxysilane was added thereto, and stirring was carried out for 15 minutes.

20 mL of a hexane solution containing 0.17 mL of methanol was added to the polymerization reaction solution, and the polymerization reaction solution was stirred for a further 5 minutes.

To the polymerization reaction solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 0.9 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 5.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 5.

Example 13

Preparation of Polymer Rubber

A 5 L capacity stainless polymerization reactor was washed, dried, flushed with dry nitrogen, and charged with 2.55 kg of industrial hexane (density 680 kg/m$^3$), 137 g of 1,3-butadiene, 43 g of styrene, 1.52 mL of tetrahydrofuran, and 1.12 mL of ethylene glycol diethyl ether. Subsequently, 1.97 mmol of bis(diethylamino)methylvinylsilane and 3.54 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 2.5 hours while continuously supplying the monomers to the polymerization reactor. The amount of 1,3-butadiene supplied was 205 g, and the amount of styrene supplied was 65 g. Furthermore, the amount of bis(diethylamino)methylvinylsilane charged per monomer unit weight charged and supplied to the polymerization reactor was 0.0044 mmol.

Following this, the polymerization reaction solution thus obtained was stirred at a stirring speed of 130 rpm, 0.70 mmol (0.20 mol per mol of n-butyllithium) of N-(3-dimethylaminopropyl)acrylamide was added thereto, and stirring was carried out for 15 minutes.

Following this, the polymerization reaction solution thus obtained was stirred at a stirring speed of 130 rpm, 2.11 mmol of 3-diethylaminopropyltriethoxysilane was added thereto, and stirring was carried out for 15 minutes.

20 mL of a hexane solution containing 0.17 mL of methanol was added to the polymerization reaction solution, and the polymerization reaction solution was stirred for a further 5 minutes.

To the polymerization reaction solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 0.9 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 5.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 5.

Example 14

Preparation of Polymer Rubber

A 5 L capacity stainless polymerization reactor was washed, dried, flushed with dry nitrogen, and charged with 2.55 kg of industrial hexane (density 680 kg/m³), 137 g of 1,3-butadiene, 43 g of styrene, 1.52 mL of tetrahydrofuran, and 1.09 mL of ethylene glycol diethyl ether. Subsequently, 1.97 mmol of bis(diethylamino)methylvinylsilane and 3.68 mmol of n-butyllithium were charged as an n-hexane solution, and polymerization was started.

Copolymerization of 1,3-butadiene and styrene was carried out at a stirring speed of 130 rpm and a polymerization reactor internal temperature of 65° C. for 2.5 hours while continuously supplying the monomers to the polymerization reactor. The amount of 1,3-butadiene supplied was 205 g, and the amount of styrene supplied was 65 g. Furthermore, the amount of bis(diethylamino)methylvinylsilane charged per monomer unit weight charged and supplied to the polymerization reactor was 0.0044 mmol.

Following this, the polymerization reaction solution thus obtained was stirred at a stirring speed of 130 rpm, 1.41 mmol (0.38 mol per mol of n-butyllithium) of N-(3-dimethylaminopropyl)acrylamide was added thereto, and stirring was carried out for 15 minutes.

Following this, the polymerization reaction solution thus obtained was stirred at a stirring speed of 130 rpm, 1.41 mmol of 3-diethylaminopropyltriethoxysilane was added thereto, and stirring was carried out for 15 minutes.

20 mL of a hexane solution containing 0.17 mL of methanol was added to the polymerization reaction solution, and the polymerization reaction solution was stirred for a further 5 minutes.

To the polymerization reaction solution were added 1.8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.) and 0.9 g of pentaerythritol tetrakis(3-laurylthiopropionate) (product name: Sumilizer TP-D, manufactured by Sumitomo Chemical Co., Ltd.), and the polymerization reaction solution was subsequently evaporated at normal temperature for 24 hours and further dried under reduced pressure at 55° C. for 12 hours, thus giving a polymer rubber. The results of evaluation of the polymer rubber are given in Table 5.

Preparation of Rubber Composition and Vulcanized Sheet 100 parts by weight of the polymer rubber thus obtained, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon black (product name: Diablack N339, manufactured by Mitsubishi Chemical Corporation), 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1 part by weight of a vulcanizing accelerator (product name: Soxinol CZ, manufactured by Sumitomo Chemical Co., Ltd.), 1 part by weight of a vulcanizing accelerator (product name: Soxinol D, manufactured by Sumitomo Chemical Co., Ltd.), 1.5 parts by weight of a wax (product name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using a 6 inch roll, and the sheet was vulcanized by heating at 160° C. for 45 minutes, thus giving a vulcanized sheet. The results of evaluation of the physical properties of the vulcanized sheet are given in Table 5.

TABLE 5

|  |  | Example 12 | Example 13 | Example 14 |
|---|---|---|---|---|
| Mooney viscosity | — | 62 | 54 | 55 |
| Vinyl bond content | % by mol | 57 | 58 | 57 |
| Styrene unit content | % by weight | 24 | 24 | 24 |
| Molecular weight distribution | — | 1.26 | 1.19 | 1.24 |

TABLE 5-continued

| | | Example 12 | Example 13 | Example 14 |
|---|---|---|---|---|
| Abrasion resistance Loss | mg/ 1,000 rotations | 260 | 240 | 230 |
| Fuel economy tan δ (70° C.) | — | 0.127 | 0.129 | 0.126 |

The invention claimed is:

1. A method for producing a conjugated diene polymer rubber, the conjugated diene polymer rubber comprising component (A) and component (B) below, the component (A) having a content, with the total amount of the component (A) and the component (B) as 100% by weight, of from 5 to 90% by weight, and the component (B) having a content of from 95 to 10% by weight, wherein the component (A) is produced by a process comprising steps A and B:

step A: copolymerizing a monomer component including a conjugated diene and a vinyl monomer represented by formula (X) below in a hydrocarbon solvent in the presence of an alkali metal catalyst,

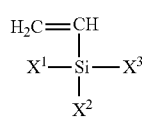

(X)

wherein $X^1$, $X^2$, and $X^3$ denote an optionally substituted hydrocarbyl group or a group represented by formula (Xa) below, and at least one of $X^1$, $X^2$, and $X^3$ is a group represented by formula (Xa) below,

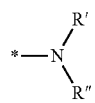

(Xa)

wherein R' and R" denote a hydrocarbyl group having 1 to 6 carbon atoms that may contain at least one atom selected from the group consisting of a nitrogen atom, an oxygen atom, and a silicon atom, a silyl group, a substituted silyl group, or a divalent group having 2 to 12 carbon atoms in which R' and R" are bonded to each other, and * represents a bonding position, and step B: reacting the resulting polymer in step A with a carbonyl group- and substituted amino group-containing compound, and wherein the component (B) is produced by a process comprising steps C and D:

step C: copolymerizing a monomer component including a conjugated diene and a vinyl monomer represented by formula (X) above in a hydrocarbon solvent in the presence of an alkali metal catalyst, and step D: reacting the resulting polymer in step C with a compound represented by formula (IIa) below, $(R^{21}O)_m Si(R^{22}A)_n R^{23}_{4-m-n}$ (IIa)

wherein m denotes a number from 1 to 3, n denotes a number from 1 to 3, m+n is from 2 to 4, $R^{21}$ and $R^{23}$ denote a hydrocarbyl group, $R^{22}$ denotes a hydrocarbylene group, A denotes a substituted amino group or an optionally substituted hydrocarbyloxy group, when there are a plurality of $R^{21}$s the plurality of $R^{21}$s may be identical to or different from each other, when there are a plurality of $R^{22}$s the plurality of $R^{22}$s may be identical to or different from each other, when there are a plurality of $R^{23}$s the plurality of $R^{23}$s may be identical to or different from each other, and when there are a plurality of As the plurality of As may be identical to or different from each other.

2. The method according to claim 1, wherein the carbonyl group- and substituted amino group-containing compound is a compound represented by formula (Ia) below,

(Ia)

wherein $Z^1$ and $Z^2$ denote a substituted amino group-containing group, a hydrogen atom, an optionally substituted hydrocarbyl group, or an optionally substituted hydrocarbyloxy group, at least one of $Z^1$ and $Z^2$ is a substituted amino group-containing group, or $Z^1$ and $Z^2$ are bonded to each other and denote a group in which a substituted amino group-containing ring structure is formed by $Z^1$, $Z^2$, and the carbonyl carbon.

3. The method according to claim 2, wherein at least one of $Z^1$ and $Z^2$ of formula (Ia) is a group represented by formula (Ib) below,

(Ib)

wherein p denotes 0 or 1, T denotes an oxygen atom or —$NR^6$—, $R^6$ denotes a hydrocarbyl group or a hydrogen atom, $R^4$ denotes a hydrocarbylene group, $R^5$ denotes a hydrocarbyl group that may contain a nitrogen atom and/or an oxygen atom, the two $R^5$s may be identical to or different from each other, a group having 2 to 20 carbon atoms in which the two $R^6$s form a single group and are bonded to the nitrogen atom via a double bond, or a divalent group having 2 to 20 carbon atoms in which the two $R^5$s are bonded to each other, and * represents a bonding position.

4. The method according to claim 1, wherein the carbonyl group- and substituted amino group-containing compound is a compound represented by formula (1-3) below,

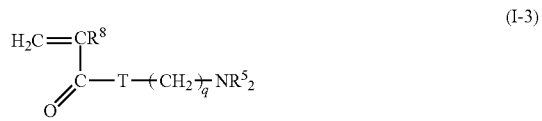

(I-3)

wherein $R^5$ denotes a hydrocarbyl group that may contain a nitrogen atom and/or an oxygen atom, the two $R^5$s may be identical to or different from each other, a group having 2 to 20 carbon atoms in which the two $R^5$s form a single group and are bonded to the nitrogen atom via a double bond, or a divalent group having 2 to 20 carbon atoms in which the two $R^5$s are bonded to each other, q denotes an integer from 1 to 10, T denotes an oxygen atom or —NR$^6$—, R$^6$ denotes a hydrocarbyl group or a hydrogen atom, and R$^8$ denotes an optionally substituted hydrocarbyl group or a hydrogen atom.

5. The method according to claim 1, wherein the compound represented by formula (IIa) is a [3-(dialkylamino)propyl] trialkoxysilane.

6. The method according to claim 1, wherein the conjugated diene polymer rubber has a vinyl bond content, with the conjugated diene-based constituent unit content as 100% by mole, of not less than 20% by mole and not more than 70% by mole.

7. A method for producing a conjugated diene polymer rubber composition, the method comprising a step of mixing 100 parts by weight of the conjugated diene polymer rubber producing by the method according to claim 1, and 10 to 150 parts by weight of a filler.

\* \* \* \* \*